US005889748A

United States Patent [19]

Shimano et al.

[11] Patent Number: 5,889,748

[45] Date of Patent: Mar. 30, 1999

[54] OBJECT LENS AND OPTICAL HEAD FOR REPRODUCING DATA FROM OPTICAL DISKS IN DIFFERENT THICKNESS OF SUBSTRATE

[75] Inventors: Takeshi Shimano, Tokorozawa; Masayuki Inoue, Yokohama; Akira Arimoto, Kodaira; Hiroyuki Minemura, Yokohama; Hisao Fujita, Hachioji; Hideaki Koyanagi, Akishima, all of Japan

[73] Assignees: Hitachi, Ltd.; Hoya Corporation, both of Tokyo, Japan

[21] Appl. No.: 772,874

[22] Filed: Dec. 26, 1996

[30] Foreign Application Priority Data

Dec. 28, 1995 [JP] Japan .................................... 7-342203

[51] Int. Cl.[6] ..................................................... G11B 7/135

[52] U.S. Cl. ......................... 369/112; 369/94; 369/44.23; 369/118; 369/44.24; 369/119

[58] Field of Search .......................... 369/112, 94, 44.23, 369/119, 117, 118, 44.24

[56] References Cited

U.S. PATENT DOCUMENTS 5,703,862 12/1997 Lee et al. ................................ 369/112

OTHER PUBLICATIONS

Optical Review, vol. 1, No. 1, 1994, "Dual Focus Optical Head for 0.6 mm and 1.2 mm Disks", Komma et al. pp, 27–29.

Mitsubishi Denki New Release Development, No. 9507 (Jun., 21, 1995)

*Primary Examiner*—Tod R. Swann
*Assistant Examiner*—Kim-Kwok Chu
*Attorney, Agent, or Firm*—Fay, Sharpe, Beall, Fagan, Minnich & McKee

[57] ABSTRACT

The objective lens has a numerical aperture NA=0.6 when reproducing a DVD having a thickness of 0.6 mm and NA=0.42 when reproducing a CD having a thickness of 1.2 mm. At a boundary of NA 0.42, a slight stepped portion is formed so as to establish a phase difference. In this case, a designed wavelength is 0.635 $\mu$m, and an optimum designed substrate thickness of a central portion is approximately 0.8 mm. While the DVD is reproduced, wave front aberration is on the order of 0.025λ, and jitter contained in the reproduction signal of the CD is equivalent to the present jitter. As a consequence, such an objective lens and an optical head with employment of this objective lens are provided, which precisely reproduce signals from the CD having the substrate thickness of 1.2 mm, and the DVD having the substrate thickness of 0.6 mm.

19 Claims, 24 Drawing Sheets

EMBODIMENT 1

| | DVD | CD |
|---|---|---|
| WAVE LENGTH (nm) | 635 | |
| FOCAL DISTANCE (mm) | 3.7026 | 3.7034 |
| INDEX OF REFRACTION OF THE LENS | 1.49 | |
| CG INDEX OF REFRACTION | 1.58 (PC) | |
| LENS THICKNESS (mm) | 2.8 | |
| CG THICKNESS (mm) | 0.6 | 1.2 |
| WD (mm) | 1.79 | 1.42 |
| NA | 0.6 | 0.42 |
| WAVE FRONT ABERRATION ON THE AXIS (λ rms) | 0.025 | 0.081 |
| IMAGE HEIGHT 0.05 WAVE FRONT ABERRATION | 0.042 | 0.087 |

DATA OF THE ASPHERIC SURFACE

| | | R | K | 4 | 6 | 8 | 10 |
|---|---|---|---|---|---|---|---|
| R1 SURFACE | UNDER φ3.1 | 2.23393 | -0.455605 | -.108141E-2 | -.157057E-3 | -.340420E-4 | -.484953E-5 |
| | OVER φ3.1 | 2.23323 | -0.472194 | -.918104E-3 | -.134218E-3 | -.431802E-4 | -.314558E-5 |
| R2 SURFACE | | -5.68351 | -10.859781 | 0.974534E-2 | -.385429E-2 | 0.787068E-3 | -.644010E-4 |

NA 0.42

-0.02    0    +0.02

NA 0.42

-0.02    0    +0.02

HEIGHT OF THE IMAGE 0.05

-0.02    0    +0.02

HEIGHT OF THE IMAGE 0.05

EMBODIMENT 2

| | DVD | CD |
|---|---|---|
| WAVE LENGTH (nm) | 635 | |
| FOCAL DISTANCE (mm) | 3.3018 | 3.3034 |
| INDEX OF REFRACTION OF THE LENS | 1.59 | |
| CG INDEX OF REFRACTION | 1.58 (PC) | |
| LENS THICKNESS (mm) | 1.9 | |
| CG THICKNESS (mm) | 0.6 | 1.2 |
| WD (mm) | 1.84 | 1.48 |
| NA | 0.6 | 0.42 |
| WAVE FRONT ABERRATION ON THE AXIS ($\lambda$ rms) | 0.025 | 0.082 |
| IMAGE HEIGHT 0.05 WAVE FRONT ABERRATION | 0.047 | 0.091 |

FIG. 27B

DATA OF THE ASPHERIC SURFACE

| | | R | K | 4 | 6 | 8 | 10 |
|---|---|---|---|---|---|---|---|
| R1 SUR-FACE | UNDER $\phi$ 2.8 | 2.15021 | -0.416128 | -.757325E-3 | -.226793E-3 | -.824812E-4 | -.416720E-5 |
| | OVER $\phi$ 2.8 | 2.14903 | -0.431091 | -.634946E-3 | -.208411E-3 | -.935233E-4 | -.172303E-5 |
| R2 SURFACE | | -13.99933 | 3.514423 | 0.933883E-2 | -.349268E-2 | 0.751831E-3 | -.644665E-4 |

FIG. 33A

EMBODIMENT 3

| | DVD | CD |
|---|---|---|
| WAVE LENGTH (nm) | 635 | |
| FOCAL DISTANCE (mm) | 3.1004 | 3.1034 |
| INDEX OF REFRACTION OF THE LENS | 1.73 | |
| CG INDEX OF REFRACTION | 1.58 (PC) | |
| LENS THICKNESS (mm) | 1.5 | |
| CG THICKNESS (mm) | 0.6 | 1.2 |
| WD (mm) | 1.83 | 1.47 |
| NA | 0.6 | 0.42 |
| WAVE FRONT ABERRATION ON THE AXIS (λ rms) | 0.025 | 0.080 |
| IMAGE HEIGHT 0.05 WAVE FRONT ABERRATION | 0.049 | 0.089 |

FIG. 33B

DATA OF THE ASPHERIC SURFACE

| | | R | K | 4 | 6 | 8 | 10 |
|---|---|---|---|---|---|---|---|
| R1 SURFACE | UNDER ϕ2.6 | 2.21691 | -0.435710 | 0.433828E-3 | -.196092E-3 | -.103071E-3 | 0.579496E-5 |
| | OVER ϕ2.6 | 2.21481 | -0.437437 | 0.309313E-3 | -.208481E-3 | -.104525E-3 | 0.566000E-5 |
| R2 SURFACE | | 73.87721 | 0.0 | 0.490769E-2 | -.302715E-2 | 0.767843E-3 | -.730947E-4 |

FIG. 36C — HEIGHT OF THE IMAGE 0.05 — M, S — -0.02 0 +0.02

FIG. 36D — HEIGHT OF THE IMAGE 0.05 — -0.02% 0 +0.02%

OBJECT LENS AND OPTICAL HEAD FOR REPRODUCING DATA FROM OPTICAL DISKS IN DIFFERENT THICKNESS OF SUBSTRATE

BACKGROUND AND SUMMARY OF THE INVENTION

The present invention relates to an optical disk apparatus for optically reproducing information from an optical recording medium, and more specifically, to an optical head for reproducing signals from optical disks whose substrate thicknesses are different from each other, and also to an objective lens employed therein.

Very recently, optical disks have greatly advanced in use as large memory changeable information recording media. Accordingly, there are many different sorts of recording/reproducing systems using disks of differing recording densities and disk sizes. Compatibility among them can hardly be secured. In particular, CD-ROMs (Compact Disk-Read Only Memorys) have been largely utilized. Thus, a strong demand for compatibility with a CD-ROM is required when optical disks are newly developed. As a next generation ROM with high density subsequent to this CD-ROM, a DVD-ROM (Digital Video Disk Read Only Memory) has been proposed very recently.

To increase the recording density in a DVD-ROM, a numerical aperture (NA) of an objective lens is increased from 0.45 (namely, for a conventional CD) to 0.6. Assuming now that a wavelength of laser light in use is selected to be "$\lambda$", a dimension of a focused spot on an optical disk is directly proportional to $\lambda$/NA. To this end, as the NA is increased, the light spot can be made small accordingly. Assuming that the light spot is small, information pits of high density can be reproduced with better quality, so that the recording density of the optical disk can be enhanced.

However, as the NA is made large, the coma aberration that occurs when the disk is inclined is rapidly increased, so that the collective spot on the optical disk is conversely deteriorated. Therefore, the NA cannot be made excessively large. As a consequence, in the DVD-ROM, such a proposal has been made that the substrate thickness of the disk is made thinner than that of the CD-ROM, namely from 1.2 mm to 0.6 mm. Since the coma aberration that occurs when the disk is inclined is directly proportional to the thickness of the disk substrate, a too thin substrate may cancel the increase in coma aberration caused when the NA is increased.

To the contrary, when the thickness of the substrate of the DVD-ROM is made different from that of the CD-ROM, the compatibility between the DVD-ROM and the CD-ROM can be hardly maintained. This is because when the light is collected through the substrate of the optical disk, spherical aberration may occur under this condition. Accordingly, the objective lens for the optical disk is previously designed in such a manner that the objective lens compensates for the spherical aberration in accordance with a specific substrate thickness. When, however, information on a CD having a substrate thickness of 1.2 mm is reproduced by employing an objective lens optimized based on a substrate thickness of 0.6 mm, for example, spherical aberration will occur due to a thickness shift in the substrate of 0.6 mm, so that the light spot may have blooming, and thus no signal can be reproduced.

The conventional means for solving this problem is described in, for instance, OPTICAL REVIEW vol. 1, No. 1 (1994), pages 27–29, and Mitsubishi Electric Company News Release, Kaihatsu No. 9507 (Jun. 21, 1995).

The former conventional means is realized with a hologram that is formed on the surface of the objective lens for 0.6 mm, whereby the information of a CD is reproduced by the diffraction light of this hologram, and the DVD is reproduced by the transmission light. In this conventional means, the pattern of the hologram is previously designed to compensate for the spherical aberration that occurs when the information of a CD is reproduced.

In the latter conventional means, both the objective lens for 0.6 mm and the objective lens for 1.2 mm are mounted on the optical head. The two objective lenses are switched by the movable actuator to use the selected lens.

The above-described conventional apparatus has the following problems.

In the former means, since the hologram is used, even when the CD is reproduced, the light spot for the DVD is produced, whereas even when the DVD is reproduced, the light spot for the CD is produced. Also, the light reflected from the disk is diffracted on the disk. These operations may cause the light amount to be lost. In particular, this may cause a great problem when a rewritable type DVD is developed in the future.

In the latter case, since the two lenses are switched, the employment of such two lenses may produce various problems, i.e., high cost, deterioration in the positional reproducibility of these lenses, and also deterioration in response characteristic caused by employing a heavy and large actuator.

In light of these problems, an object of the present invention is to precisely reproduce a signal of a CD having a substrate thickness of 1.2 mm, and also a signal of a DVD having a substrate thickness of 0.6 mm at a low cost without any loss in light amount.

To solve the above-described problems, in an optical head comprising: a light source; an objective lens for focusing light from the light source to an optical information recording medium; a light branching element for branching reflection light reflected from an optical recording medium from a light path returned to the light source; a photodetector; and means for positioning a focused spot onto an information pit array of the optical recording medium; root mean square wave front aberration Wrms, a wavelength $\lambda_2$ of the light source, and a numerical aperture $NA_2$ of the objective lens may satisfy;

$$\left\{1-\left(\frac{2\pi}{\lambda_2}W_{rms}\right)^2\right\}\left(\frac{NA_2}{\lambda_2}\right)^2\sin^2\left(\frac{2n_2\pi d}{\lambda_2}\right)\geqq\left(\frac{NA_1}{\lambda_1}\right)^2\sin^2\left(\frac{2n_1\pi d}{\lambda_1}\right), \tag{1}$$

where characters "$n_1$" and "$n_2$" shows refraction indices of information recording medium substrates with respect to wavelengths $\lambda_1$ and $\lambda_2$; symbol "d" denotes a depth of an information pit; a light source wavelength of an optical head for recording or reproducing information from the optical information recording medium under such a degree that aberration can be optically neglected; and a numerical aperture of the objective lens is $NA_1$.

Also, in an objective lens for focusing laser light onto an information recording film surface for recording, or reproducing information via a transparent parallel plate substrate on, or from an optical information recording medium for optically recording/reproducing the information, a thickness of said substrate for focusing the laser light and independently having aberration of the same conditions is different at a central portion and a peripheral portion.

Also, in an objective lens for focusing laser light having a wavelength of $\lambda_2$ on the information recording film surface in order to record, or reproduce the information from two sorts of optical information recording mediums having different substrate thicknesses, different information pit hole depths, and different recording density; a peripheral portion develops no aberration when the laser light is focused through a substrate thickness of a first optical information recording medium with large recording density; a central portion develops no aberration when the laser light is focused through a substrate thickness between two sorts of substrate thicknesses; a focused spot root mean square wave front aberration of incident light in combination with light passing through the central portion is lower than, or equal to approximately 0.04λ ("λ" is a wavelength of laser light in use) with respect to the substrate of the first optical information recording medium; and while recording, or reproducing a second optical information recording medium having low recording density by way of light passing only through the central portion, a numerical aperture $NA_2$ only about the central portion, a substrate thickness by which the light of the center portion is collected without any aberration, and also wave front aberration $W_{rms}$ caused by an error in the substrate thickness of the second optical information recording medium may substantially satisfy the above-described formula 1 (note that "$n_1$" and "$n_2$" indicate refraction indices of information recording substrates with respect to wavelengths $\lambda_1$ and $\lambda_2$) in comparison with an optical head having a light source wavelength $\lambda_1$ under which information is optically recorded, or reproduced on, or from the second optical information recording medium without any aberration under better conditions, and a normal objective lens of a numerical aperture $NA_1$.

Actually, in the case that the substrate thickness of the second optical information recording medium is approximately 1.2 mm, the objective lens may substantially satisfy the following expression:

$$\left\{1-\left(\frac{2\pi}{\lambda_2}W_{rms}\right)^2\right\}\left(\frac{NA_2}{\lambda_2}\right)^2\sin^2\left(\frac{0.26\pi}{\lambda_2}\right)\geq 0.24(1/\mu m^{-2}) \tag{2}$$

In these objective lenses, the Abbe's sine condition as an overall objective lens, may be substantially satisfied.

Also, in these objective lenses, a shape of a boundary portion between the peripheral portion and the central portion is smoothly connected.

In these objective lenses, an optimum substrate thickness of the central portion is continuously variable in a coaxial shape from a lens center.

Also, in these objective lenses, a thin film is loaded on either the peripheral portion or the central portion, so that the optimum substrate thickness of the central portion is different from that of the peripheral portion.

Also, these object lenses are arranged by a lens whose substrate thickness is optimized over an entire surface, and a parallel plate arranged on the side of an object, a hole being formed in a central portion of the parallel plate.

An optical head capable of reproducing a signal from an optical recording medium having a substrate thickness of 1.2 mm and also a signal from an optical recording medium having a substrate thickness different from 1.2 mm is constituted by employing these objective lenses.

Also, signals can be reproduced from the optical disk having the substrate thickness of 1.2 mm and from the optical disk having the substrate thickness different from 1.2 mm without replacing the objective lens. While the optical disk having the substrate thickness different from 1.2 mm is reproduced, a ratio of the incident light amount of the lens portion to the total light amount of the reproducing spot is made higher than, or equal to 90%.

While the information recorded on the substrate having the thickness of 1.2 mm is reproduced by employing these objective lenses,. the light amount of the light entered into the peripheral portion is reduced or interrupted.

Furthermore, either this light amount reducing means or light interrupting means is moved in conjunction with the tracking operation of the objective lens to the information pit.

Also, the objective lens is made with either the light amount reducing means or light interrupting means in an integral form.

In the case that the information recorded on the substrate having the thickness of 1.2 mm is reproduced, a dimension of a photodetector and a dimension of an optical system are optimized as other means for reducing the light in the peripheral portion.

An optical head capable of reproducing signals from optical recording mediums has substrate thicknesses of 1.2 mm and 0.6 mm by employing these objective lenses.

Also, in the optical head, in order to optically record/reproduce the information pit through a transparent parallel plane substrate, a paraxial focus of the objective lens for focusing laser light onto an information recording film surface on the side of the light source is separated from a surface of the objective lens on the side of the light source by at least 2 mm; the optical head further comprises means for reducing a light amount of light or for interrupting the light incident to a peripheral portion of the objective lens; a galvanometer mirror is employed as an actuator for tracking the light spot to the information pit array on the optical recording medium; and a rotary shaft of the galvanometer mirror is arranged near the paraxial focus of the objective lens on the side of the laser light source.

Also, in the above-described objective lens, the paraxial focus of the objective lens on the side of the light source is separated from a surface of the objective lens on the side of the light source by at least 2 mm.

Further, while using this objective lens, in order to reproduce information recorded on a substrate having a thickness of 1.2 mm, the optical head further comprises means for reducing a light amount of light or for interrupting the light entered into a peripheral portion of the objective lens; a galvanometer mirror is employed as an actuator for tracking the light spot to the information pit array on the optical recording medium; and a rotary shaft of the galvanometer mirror is arranged near the paraxial focus of the objective lens on the side of the laser light source.

When two sets of optical disks having different substrate thickness from each other are reproduced by employing a single objective lens, it is not necessarily avoidable that aberration may occur at least in one of these optical disks. Thus, a description will now be made as to what degree a focused light spot is deteriorated in case that aberration exists, and what degree a signal quality of an optical disk is lowered with respect to no aberration. Conventionally, as the evaluation index of the focused spot, there are root mean square wave front aberration, and the Strehl intensity related to one-to-one correspondence as follows:

$$I_{st}=1-\left(\frac{2\pi}{\lambda}\right)^2W_{rms}^2 \tag{3}$$

Since these items are such an index used to compare the magnitudes of aberration under a certain single numerical aperture and a certain single wavelength, these items do not constitute such an index used to judge the degree to which collective spots having different wavelengths and different numerical apertures, containing aberration, are reduced. Accordingly, the concept of the Strehl intensity is expanded in order that this comparison can be made for definition purposes. As is well known in the field, in case of no aberration, a dimension of a light spot is directly proportional to λ/NA. As a consequent, assuming now that a light amount of light entered into an incident pupil of an objective lens, it is conceivable that a central intensity of the light spot is inversely proportional to an area of the collective spot. Thus, this must be directly proportional to a square value of NA/λ. In consideration of influences caused by the aberration, a central intensity in case of having aberration with respect to the central intensity of no aberration corresponds to the Strehl intensity. As a consequence, in the case that there is an index for judging focusing conditions of the light spot containing certain aberration and different wavelengths and also different numerical apertures, such a value found by multiplying the Strehl intensity by the square of NA/λ is acceptable. This is referred to as an "expanded Strehl intensity", which will be defined as follows:

$$I_{ex} = I_{st}\frac{NA^2}{\lambda^2} \tag{4}$$

When a wavelength and a depth "d" of an information pit of a CD are virtually changed, the amplitude of a reproduction signal is also varied. Assuming now that a refractive index of a substrate is "n" and a depth of an information pit is "d", it is known that the amplitude of the reproduction signal is changed in proportion to approximately $\sin^2(2\pi nd/\lambda)$. As a consequence, such a value obtained by multiplying the expanded Strehl intensity by this value is referred to a "performance factor". This performance factor is expressed as follows:

$$PF = I_{st}\frac{NA^2}{\lambda^2}\sin^2\left(\frac{2\pi nd}{\lambda}\right) \tag{5}$$

As a consequence, reproduction signals for optical heads containing aberration, different numerical apertures, and different wavelengths can be estimated. In other words, even when there is aberration, there are probabilities that such conditions can be found, namely the same signal qualities as those of no aberration with the different wavelengths and the different numerical apertures.

In such a case that an objective lens is subdivided into a central portion and a peripheral portion, and optimum thickness of this substrates for optimally collecting this laser light are different from each other, the light in the peripheral portion becomes no aberration when the laser light is focused through a predetermined and optimized substrate thickness of this peripheral portion. However, since spherical aberration will occur in the central portion whose substrate thickness is optimized and different from the substrate thickness, the aberration over the entire lens pupil containing the central portion and the peripheral portion does not become zero.

Generally speaking, in order that the root mean square wave front aberration is minimized with respect to the Seidel's spherical aberration, i.e., $$W = W_{40}\rho^4 \tag{6},$$

both defocusing and a phase shift may be applied in such a manner that the expression for the Zernike's spherical aberration has the following shape:

$$W = W_{40\rho}^4 - W_{40\rho}^2 + \frac{1}{6}W_{40}. \tag{7}$$

In this expression characters "$W_{40}$" indicates the Seidel's aberration coefficient of the spherical aberration, and "ρ" shows a radius coordinate when a pupil radius is selected as 1. At this time, the root mean square wave front aberration is given as follows:

$$W_{rms} = \frac{W_{40}}{6\sqrt{5}}. \tag{8}$$

Also, in order that root mean square wave front aberration is minimized when spherical aberration only given to the central portion is viewed as the entire pupil, in such a case that both defocusing and a phase shift are applied in such a manner that the above-described wave front aberration defined by the expression 7 becomes only in the central portion, the aberration at the peripheral portion makes 0. Assuming now that a divisional radius of a central portion and a peripheral portion is set to "R", and the $W_{40}$ is newly set as a Seidel's aberration coefficient of the spherical aberration at the radius "R", this aberration function is given as follows:

$$W = \begin{cases} W_{40}\left(\frac{\rho}{R}\right)^4 - W_{40}\left(\frac{\rho}{R}\right)^2 + \frac{1}{6}W_{40} & (\rho \leqq R) \\ 0 & (R \leqq \rho) \end{cases} \tag{9}$$

At this time, root mean square wave front aberration as the entire pupil is given in a similar manner as follows:

$$W_{rms} = \frac{W_{40}R}{6\sqrt{5}}. \tag{10}$$

In accordance with the present invention, this root mean square wave front aberration is made less than or equal to approximately 0.04.

The reason why this value is selected is given as follows: In general, the Maréchal's criterion such that the root mean square wave front aberration is less than or equal to 0.07λ is widely utilized as a dimension of aberration. However, in an optical head, it is required to be suppressed to this value involving various factors other than an objective lens. These factors are, for instance, defocusing; spherical aberration caused by head adjusting shifts; astigmatism of a semiconductor laser; coma aberration caused by a disk inclination; spherical aberration caused by a disk substrate thickness shift; and also spherical aberration, coma aberration, and astigmatism caused by an objective lens forming error. There are 11 items in total by including the aberration according to the present invention. Assuming now that all of these contributions are equal to each other, since it is conceivable that the entire variance caused by the errors of the various factors is equal to a summation of variance, approximately 0.021λ is acceptable as the root mean square wave front aberration allowable to the errors, according to the present invention, based upon the following expression:

$$W_{rms} < \sqrt{\frac{0.07^2}{11}} = 0.021(\lambda). \tag{11}$$

As a consequence, the aberration owned by the objective lens is defined as follows. If the spherical aberration, the coma aberration, and the astigmatism caused by the forming errors are involved with the aberration according to the present invention, then the variance becomes 4 times. In other words, as the root mean square wave front aberration, it must be less than or equal to 0.042λ, i.e., two times.

In such a case that information is reproduced through a substrate having a thickness of 1.2 mm, light passing through only a central portion is used. At this time, the thickness of the substrate at which the light passing through only the central portion becomes no aberration is not always equal to 1.2 mm as an optimum thickness. As previously explained, this is because the root mean square wave front aberration must be less than or equal to approximately 0.04λ, involving the lens forming error, when the signal is reproduced through such a substrate thickness that no aberration results at the peripheral portion by way of the light of the overall pupil combining the central portion with the peripheral portion. However, if the substrate thickness is excessively deviated from 1.2 mm, then the spherical aberration will be increased when the signal is reproduced through the substrate having the thickness of 1.2 mm by employing only the central portion.

An allowable value of spherical aberration for the light passing through this central portion may be determined based upon such a condition that a reproduction signal similar to that of the conventional CD is obtained. First of all, since the wavelength of the light used in the conventional CD is 0.78 μm and the numerical aperture is 0.45, it can be understood that such spherical aberration is allowable within a range that the performance factor is obtained under this condition. The performance factor of the CD without any aberration is equal to $PF=(0.45/0.78)^2 \sin^2(\pi/3)=0.250$ ($\mu m^{-2}$), since the above-described wavelength, numerical aperture, and pit depth "nd" is about λ/6. Also, in the case of aberration existing, it is conceivable to obtain a performance factor having the same or larger value under a shorter wavelength or a larger numerical aperture. Normally, also in the CD, if it is conceivable that the Strehl intensity becomes 0.8 at minimum obtained from 10 items, i.e., 7 items of the defocusing; spherical aberration; coma; astigmatism caused by shift of head adjustment; astigmatism of the laser; coma aberration caused by the disk inclination; and the spherical aberration caused by the disk substrate thickness deviation, and other than the object lens, and 3 items caused by the spherical aberration caused by shift of forming the object lens; astigmatism; and coma aberration, the Strehl intensity is $1-(1-0.8)/10\times3=0.94$ taking account of the influences of the aberration caused by only the objective lens. In this case, the performance factor becomes $0.250\times0.94=0.235(\mu m^{-2})$. As a result, it can be expected that if the performance factor is greater than or equal to approximately 0.235, then the reproduction signal performance equivalent to that of the CD can be achieved.

As explained above, even when the spherical aberration is left in the central portion, it could be represented that if the DVD is reproduced with either the shorter wavelength or the larger NA than that for the CD, then the reproduction signal equivalent to that of the CD can be obtained. As a consequence, since the spot diameter of λ/NA must be less than or equal to the value of CD, i.e., 0.78/0.45=1.733 μm, the numerical number only for the central portion must be larger or equal to 0.57λ ("λ" is indicated in unit of μm), depending upon the magnitude of the aberration.

Since all of the above descriptions are related to the performance of the light on the axis, this objective lens should be designed so as to substantially satisfy the Abbe's sine condition as the entire lens in order that the performance of the light outside the axis is assured to some extent.

Normally, since an objective lens is processed by way of molding, if the objective lens contains a stepped portion, then such objective lens can be hardly processed for the sake of molding. As a consequence, also as to the objective lens according to the present invention, shapes of boundary portions between peripheral portions and central portions must be connected in a smooth manner within a range where the above-explained performance is not deteriorated.

The above description describes that the region of the objective lens is subdivided into two regions. The larger the dividing number is increased, the more the free degree of designing is increased, so that more suitable designs are available. As a consequence, the optimum substrate thickness of the central portion may be eventually, continuously variable from the lens center in a coaxial shape.

Also, in order to form a stepped portion of a boundary portion between a peripheral portion and a central portion, after a lens having no stepped portion has been formed, a thin film is loaded on this lens, so that a desirable phase shift may be applied.

As another method, for such an objective lens, all surfaces which are optimized as to the optimum substrate thickness of the above-described central portion, a parallel plate having a thickness equal to a difference between the optimum substrate thickness of the central portion and the optimum substrate thickness of the peripheral portion may also be employed, into which a hole is formed at a center portion thereof on the side of this disk.

In an optical head with employment of these objective lenses, when information recorded on the substrate having the thickness of 1.2 mm is reproduced, it cannot be avoided that aberration of light in a peripheral portion is considerably increased. As a consequence, there are some possibilities that the adverse influences of this region should be removed. At this time, it is required to employ such a means for reducing a light amount of light, or for interrupting the light entered into the peripheral portion.

This may be used to design a dimension of a photodetector and an optical system. It should be noted that since there is actually an adverse influence of diffraction light by an optical disk, strictly speaking, the peripheral light cannot be completely eliminated only by the limiting aperture employed in the detection optical system. However, this peripheral light may be reduced to some degrees.

Also, there is the following conventional problem. That is, while a rotation center of an optical disk is deviated from a rotation center when a guide groove of the optical disk is cut, if the objective lens is moved in response to this decentering for the tracking purpose, then the intensity distribution of the reflection returning light is shifted. Accordingly, an offset may be produced in a push-pull tracking signal. This problem becomes serious in such a case that the above-described means for interrupting the light in the peripheral portion is not moved in conjunction with the objective lens. If the double servo system is introduced, then this decentering does not make up a serious problem, because the course actuator substantially may trace, and the objective lens does not substantially move. This double servo system has been widely utilized in, especially, magnetooptical disk units marketed as computer external storage units. However, since low cost is required for music CDs, the double servo system is not employed in the present models, resulting in a problem.

As to this problem, the light interrupting means may be moved in conjunction with the objective lens. Alternatively, the light interrupting means may be moved in the integral form with the objective lens.

As another method, this problem may be solved not by moving the lens, but by employing such an actuator that a moveable mirror called as a "galvanometer mirror" so as to vary the inclination of the light entered into the objective lens, and thus the light spot is moved. To this end, a rotation center of the galvanometer mirror is positioned on a focal point of an objective lens on the side of the light source. When this galvanometer mirror is positioned in the above-described manner, since the light on the optical axis is necessarily entered into the optical disk unless this optical disk is inclined, there is no shift in the intensity distribution of the light again reflected from the galvanometer mirror and then returned. To this end, in order that the galvanometer mirror is arranged at a paraxial focus of the objective mirror on the side of the light source, this paraxial focus on the side of the light source must be separated from the surface of the objective lens on the side of the light source more than 2 mm on the side of the light source. This is useful not only for the above-described objective lens according to the present invention, but also for such an objective lens. That is, an overall surface of this objective lens is optimized to become a substrate thickness other than 1.2 mm, and a numerical aperture thereof is greater than that for the CD, and also a CD reproduction is carried out only in the central portion of this objective lens. This is, of course, useful for such a case that the objective lens according to the present invention is employed.

BRIEF DESCRIPTION OF THE DRAWINGS

FIG. 27A and FIG. 27B are tables for indicating a lens design specification and a design shape having a lens refraction index of 1.59.

FIG. 33A and FIG. 33B are tables for indicating a lens design specification and a design shape having a lens refraction index of 1.73.

DESCRIPTION OF THE PREFERRED EMBODIMENTS

Referring now to drawings, embodiments of the present invention will be described.

Figure 1A:
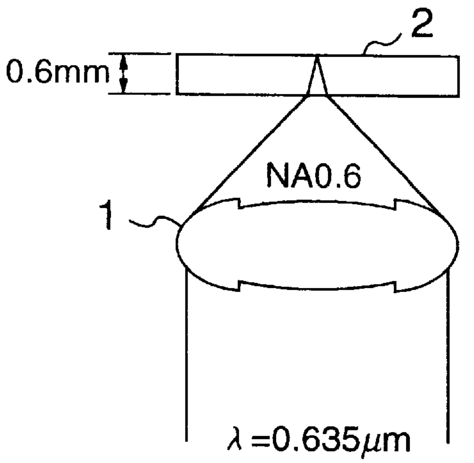
FIG. 1A and FIG. 1B are conceptual diagrams for representing a basic idea of the present invention.
Figure 1B:
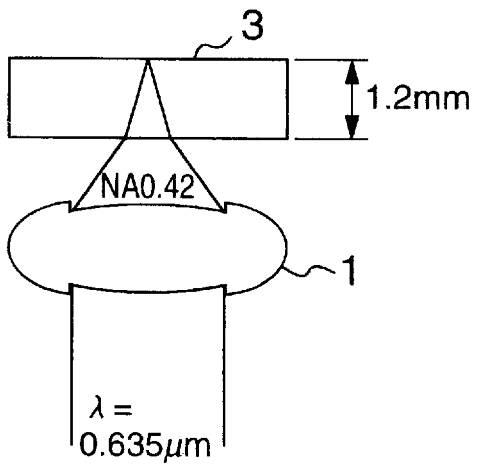

FIG. 1A and FIG. 1B are diagrams for representing basic ideas of the present invention. When a DVD2 with use of a substrate having a thickness of 0.6 mm is reproduced, an objective lens 1 (NA=0.6) is used to reproduce the DVD2, whereas when a CD3 with use of a substrate having a thickness of 1.2 mm is reproduced, the objective lens 1 (NA=0.42) is used to reproduce the CD 3. At a boundary of NA1.42, a small stepped portion is made in order to make up a phase difference. In this case, a designed wavelength is 0.635 $\mu$m. A central portion of the lens 1 is set to such a condition that an optimum thickness of a substrate is 0.8 mm, and a peripheral portion (thick portion) of this lens 1 is set to such a condition that an optimum thickness of a substrate is 0.6 mm.

The above-described designing ideas are established based on the following reasons.

Figure 2:
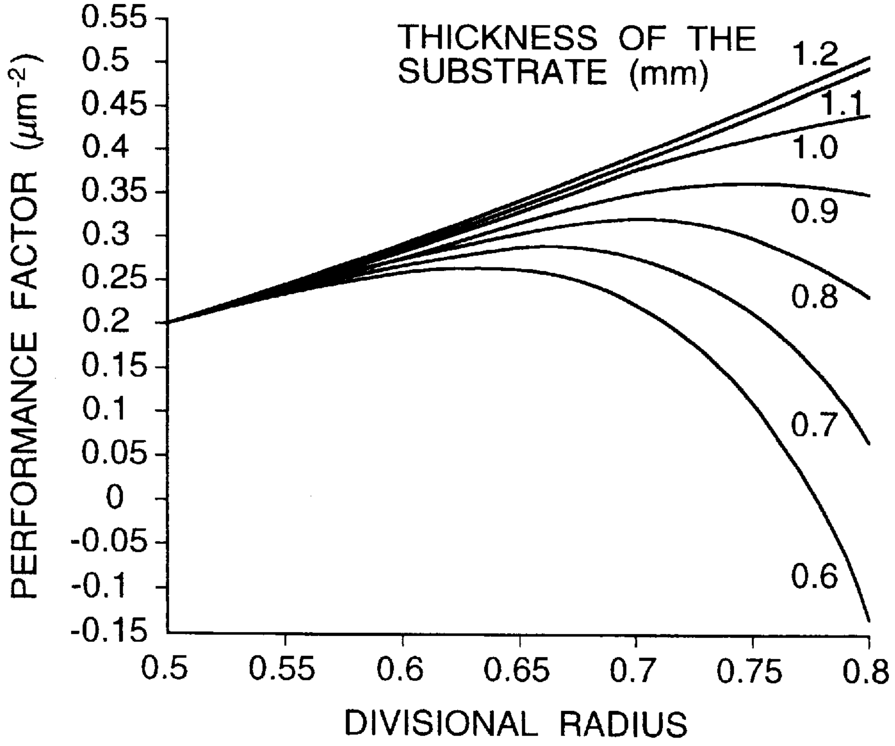
FIG. 2 is a graphic representation for showing a performance factor in the case that a CD without decentering is reproduced with respect to a divisional radius.

FIG. 2 is a graphic representation for representing performance factors (referred to as "PF" hereinafter) at the central portion while the optimum designing thickness of the central portion of the substrate is varied in order to evaluate spot performance when a CD is reproduced with respect to a divisional radius of the central portion to the peripheral portion under such a condition that a radius of the portion having NA0.6 is selected as 1. In this case, light existing in the peripheral portion outside the divisional radius is cut out by an aperture limit. The greater the optimum designed thickness of the substrate is shifted from 1.2 mm, the larger the spherical aberration becomes, so that the PF becomes small. The larger the divisional radius and also the NA of the central portion become, the smaller the spot size of the diffraction limit becomes in such a range that the spherical aberration is small. Accordingly, the PF becomes large, when the NA further becomes large and also the spherical aberration further becomes large, conversely, the PF is turned to be decreased. As a consequence, it could be seen that even when the optimum designed substrate thickness of the central portion is 0.6 mm, namely, by merely aperture limiting, there is the divisional radius having the same PF level as that of the conventional non-aberration CD with 0.25 ($\mu m^{-2}$).

In this example of FIG. 2, the disks without any decentering were evaluated under ideal conditions.

However, in an actual case, when the objective lens is moved in following to the decentering of the disks for the sake of tracking operation, light may pass through also the peripheral portion having the large aberration. When the limiting aperature is fixed, the eclipse of light will appear (as will be shown later).

Figure 3:
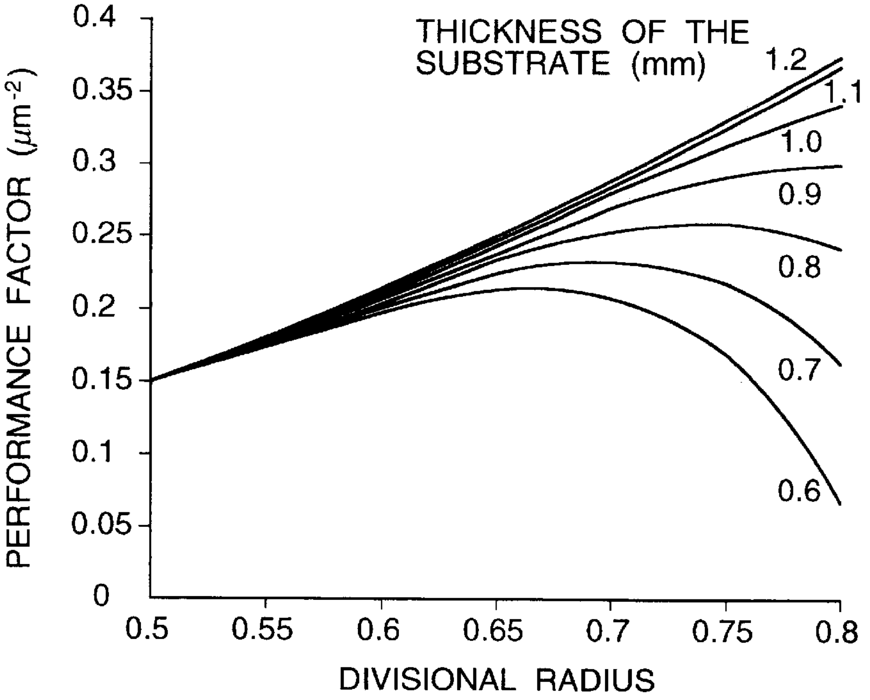
FIG. 3 is a graphic representation for showing a performance factor in the case that a CD with decentering is reproduced with respect to a divisional radius.

In FIG. 3, there is similarly shown a calculation result when the objective lens is moved by 0.3 mm in following the decentering. In this drawing, assuming now that a diameter of an effective luminous flux of the objective lens is 3.96 mm, the lowest order comma aberration obtained from very small movement of the spherical aberration by the decentering is conducted, and the numerical aperture used to calculate the PF taking account of the eclipse is corrected. In accordance with this result, it can be seen that the entire PF is deteriorated, and then the optimum substrate thickness becomes more than approximately 0.8 mm under which the same leveled PF as the conventional CD of 0.25 ($\mu m^{-2}$) without aberration can be obtained.

Figure 4:
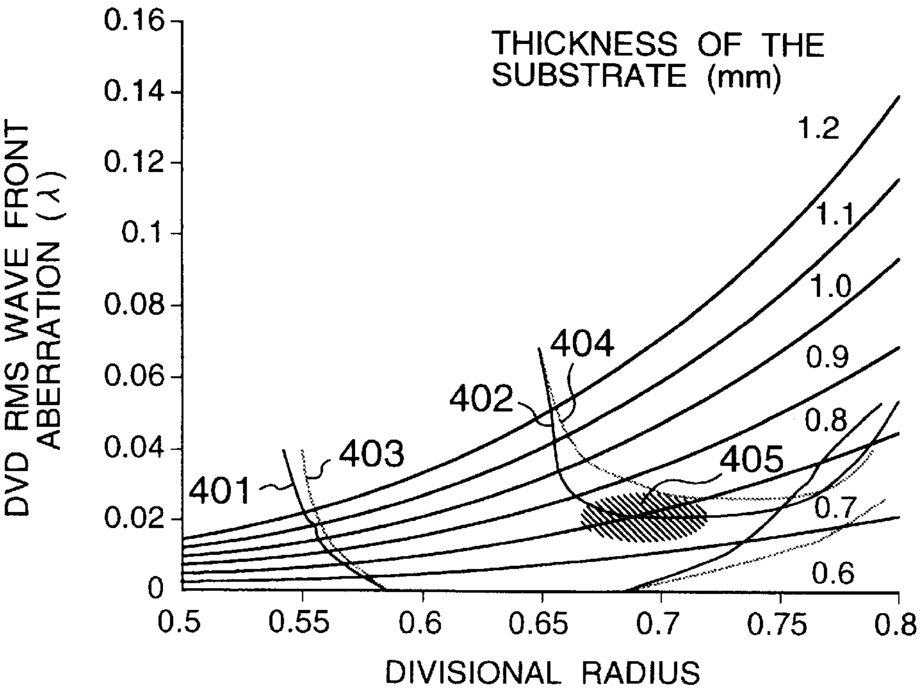
FIG. 4 is a graphic representation for showing RMS wave front aberration occurred during DVD reproduction with respect to a divisional radius.

FIG. 4 shows root mean square wave front aberration of a focused spot when a DVD, namely, a substrate of 0.6 mm is reproduced by using the entire area of the lens at this time. Reference numeral 401 indicates PF in case of no decentering, reference numeral 402 indicates PF in case of decentering, reference numeral 403 shows jitter in case of no decentering, and reference numeral 404 denotes jitter in case of decentering. The regions where the PFs obtained from FIG. 2 and FIG. 3 are greater than or equal to 0.25, are displayed under overlapping states. Accordingly, it can be seen that the region when the wave front aberration becomes minimum in case of decentering is such that the divisional radius rate is 0.7, namely, the central portion NA is 0.42, the optimum designed substrate thickness of the central portion is approximately 0.8 mm, and the wave front aberration is on the order of 0.02λ. As a consequence, a proper region is denoted by a hatched line portion 405. The NA of this central portion becomes merely larger than NA 0.366 in the wavelength of 0.635 $\mu$m as for the light spot diameter of the presently available CD without aberration.

Figure 5:
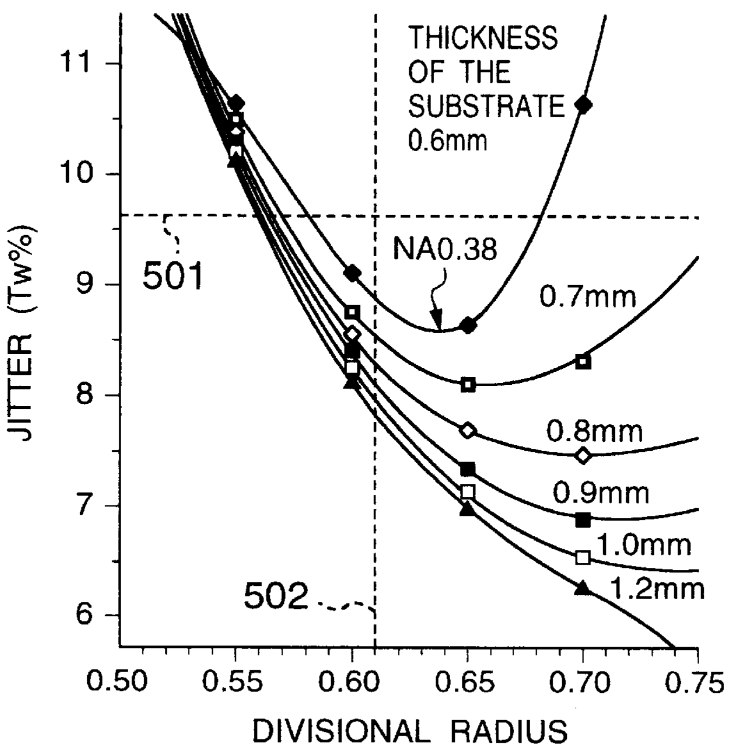
FIG. 5 is a graphic representation for indicating a jitter simulation in the case that a CD without decentering is reproduced with respect to a divisional radius.

FIG. 5 indicates a jitter calculation result in case of no decentering, which is calculated by a simulation based on the scalar diffraction theory at this time. In this case, it is assumed that a signal-to-noise ratio of a reproduction signal is approximately 25 dB, the jitter is calculated under such an initial condition that a slice level in a bit pattern where the worst shift occurs is varied in accordance with this noise level. Similar to FIG. 2, even when the substrate thickness is 0.6 mm, it can be seen that there is a divisional radius that is the same as the jitter calculation value 501 under reproduction condition for the conventional CD without aberration. The same λ/NA as the CD corresponds to the divisional radius of approximately 0.61 (indicated by 502).

Figure 6:
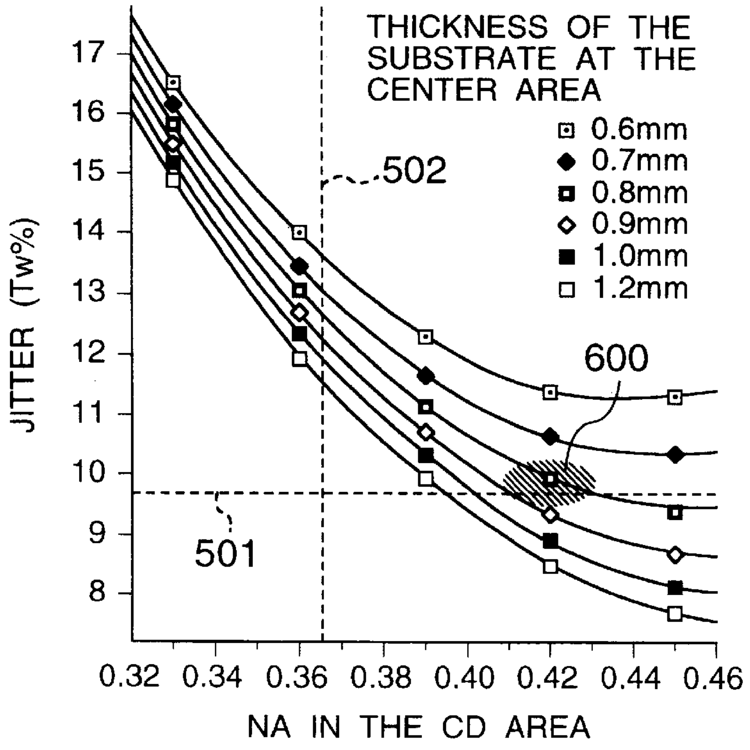
FIG. 6 is a graphic representation for indicating a jitter simulation in the case that a CD with decentering is reproduced with respect to a divisional radius.

Similarly, FIG. 6 indicates a jitter calculation result obtained by a simulation based on the scaler diffraction theory in case of decentering. The decentering becomes 0.3 mm, and the diameter of luminous flux is 3.96 mm. An optimum region is denoted by a hatched line portion.

In FIGS. 5 and 6, a region 405 where the same jitter calculation value is calculated as that under reproduction condition of the conventional CD without aberration is represented in FIG. 4. A confirmation can be made that this region is substantially equal to the conventional CD having no aberration of the PF, and thus the design with employment of the PF is appropriate.

Figure 7:
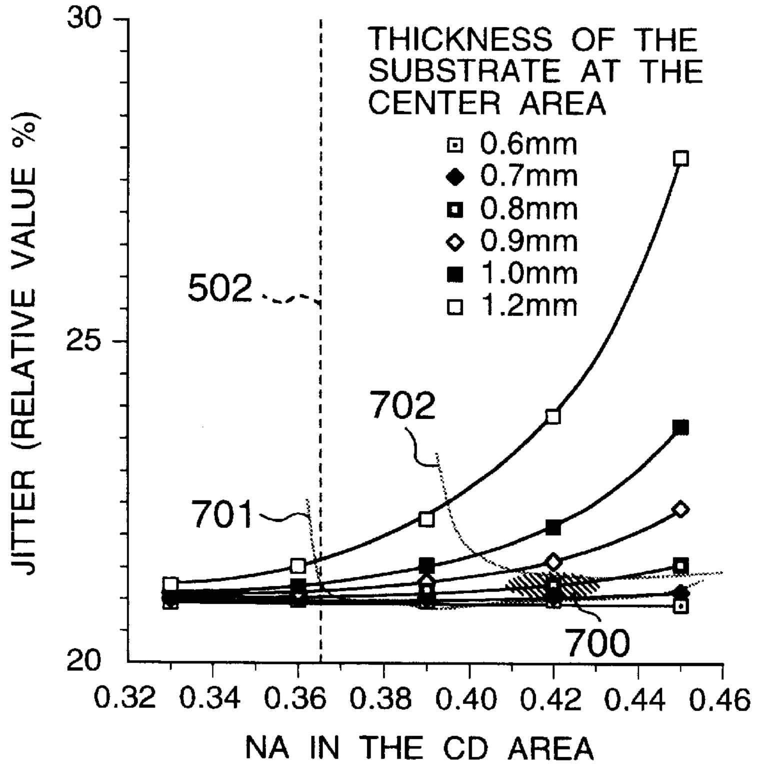
FIG. 7 is a graphic representation for showing a jitter simulation during DVD reproduction with respect to a divisional radius.

FIG. 7 represents a jitter calculation result (in case of no decentering) in the DVD similar to FIG. 5 and FIG. 6. In the DVD, the waveform equalization is absolutely required. However, since the equalizing condition is not yet defined, the absolute value of this calculation is the relative calculation result having probability that the calculation value is different from the actual value. In this drawing, such a region where the same value as the jitter of the conventional CD with no aberration conditions shown in FIG. 5 and FIG. 6 is obtained is indicated by overlap. An optimum region 700 obtained in this manner is substantially coincident with the value by the PF. Reference numeral 701 indicates jitter in case of no decentering in a CD, and reference numeral 702 denotes jitter in case of decentering in the CD.

Figure 8:
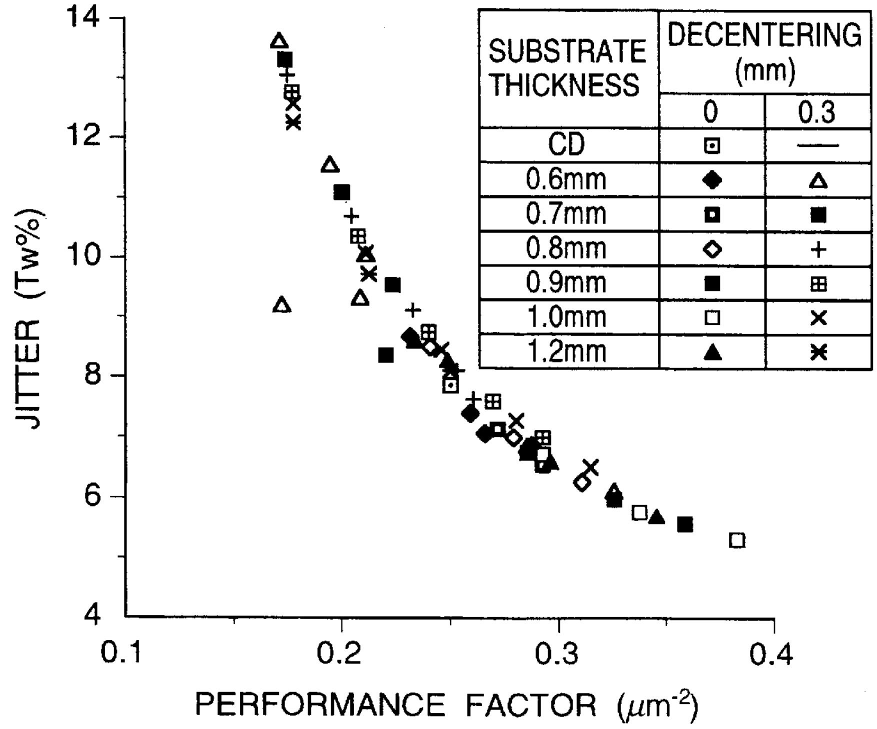
FIG. 8 is a graphic representation for indicating a correspondence between a jitter and a performance factor during CD reproduction.

Furthermore, FIG. 8 represents a comparison between the jitter and the PF when the CD is reproduced in the above-described calculations. It can be understood that the PF substantially exclusively corresponds to the jitter in such a case that the substrate thickness, namely aberration, the NAs, and the wavelengths are different from each other. As a consequence, when a lens is designed, a signal quality can be substantially predicted even when no complex jitter is simulated or no experiment is carried out, if lens parameters such as a pit depth of a disk, a reproduced wavelength, aberration, a divisional radius, and a numeral aperture can be known.

Figure 9:
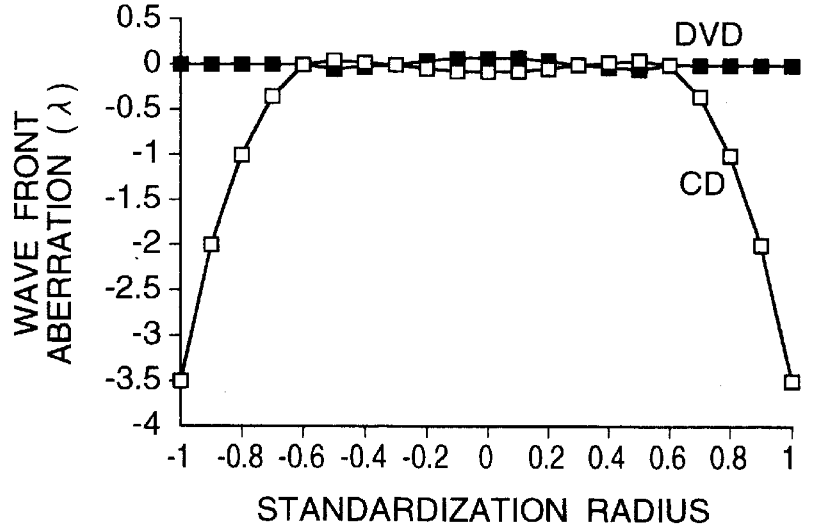
FIG. 9 is a graphic representation for showing a relationship between wave front aberration and a standardization radius.

FIG. 9 shows wave front aberration in case that a CD and a DVD are reproduced under such design values. In this case, as previously described, the RMS wave front aberration when the DVD is reproduced is about 0.02λ, whereas the RMS wave front aberration when the CD is reproduced is 0.07λ within a range of NA 0.42. Although the wave front aberration during the CD reproduction is large, the PF is substantially equal to the CD. Also, as to the jitter, since it becomes substantially same as the conventional CD no-aberration condition, there is no problem.

Figure 10:
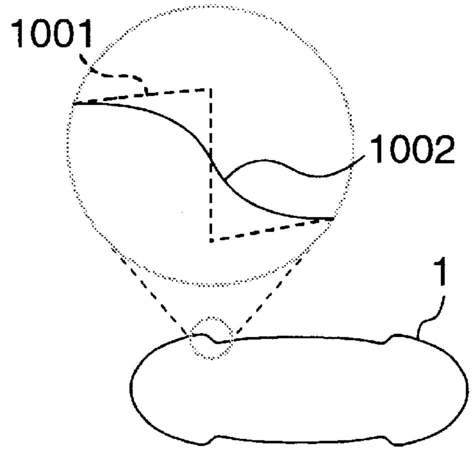
FIG. 10 is a side view of a lens according to an embodiment in the case that stepped portions are smoothly connected to each other.

FIG. 10 is an embodiment in case that stepped portions of a lens are connected to each other in a smoothing manner. The stepped portions are approximated by a continuous curve 1002 close to a designed shape 1001 within such a range that the performance of the lens is not so deteriorated, so that the processing performance during the molding process can be improved.

Figure 11:
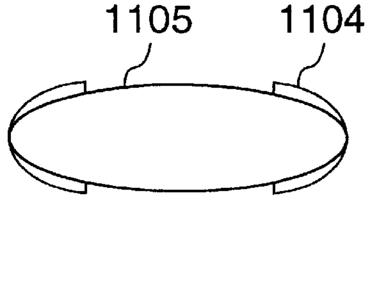
FIG. 11 is a side view of a lens according to an embodiment in the case that stepped portions are formed by thin films.

FIG. 11 is an embodiment in such a case that stepped portions of a lens are molded by thin films 1104. As a results the molding performance of an original lens 1105 can be improved.

Figure 12A:
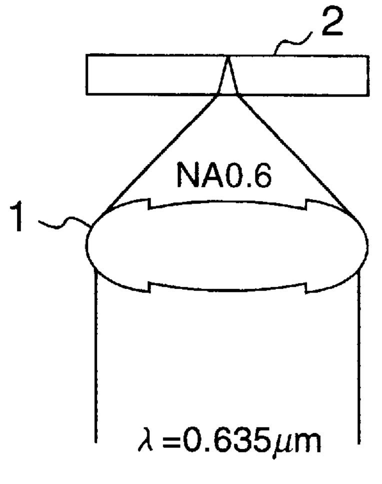
FIG. 12A and FIG. 12B are conceptual diagrams in the case that a diaphragm is employed during CD reproduction.
Figure 12B:
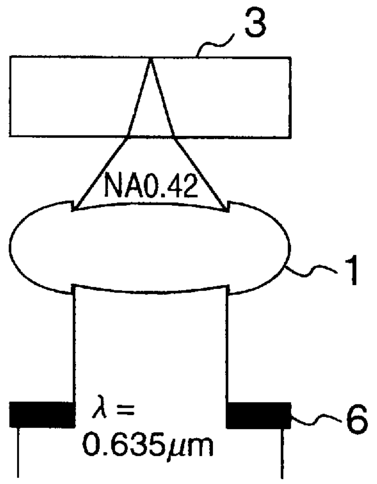

FIG. 12A and FIG. 12B show an embodiment in such a case that when a CD is reproduced, light at peripheral portions is interrupted by a diaphragm 6. When a DVD is reproduced, this diaphragm should be removed. Thus, the diaphragm 6 may be constituted by employing such a mechanism that this diaphragm is mechanically picked up from the optical path, or an aperture is mechanically variable, which is usually utilized in photographing cameras. Alternatively, when a liquid crystal device and/or other opto-electronic switches are employed, the light in the peripheral portions may be electrically interrupted without employing the mechanical mechanism. Similarly, the intensity of this light may be reduced, instead of the above-explained light interruption.

Figure 13:
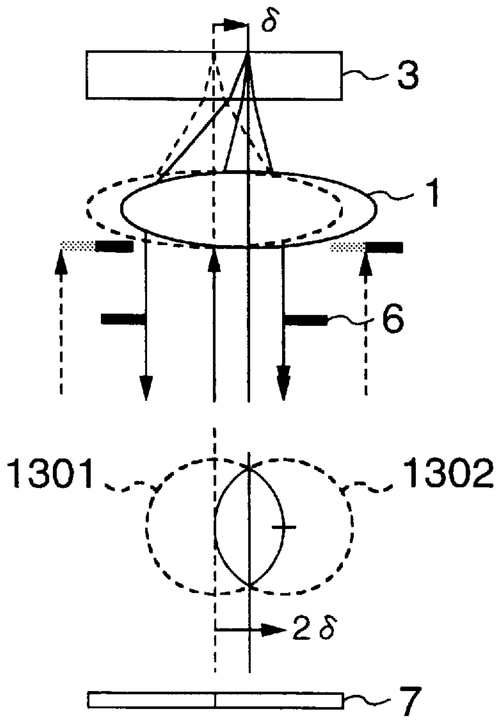
FIG. 13 is a conceptual diagram for explaining light flux deviation caused by lens movement.

FIG. 13 illustrates the following conditions. That is, in connection with movement of the objective lens, light 1301 which passes through the diaphragm 6 whose position is located and then is entered is collected on the disk 3 by the objective lens 1, and then is reflected from the disk 3. When this reflection light 1302 again passes through the diaphragm 6, a center of a light distribution of the reflection light 1302 is shifted twice as the movement amount of the lens, and thus the reflection light is eclipsed by the diaphragm 6. As a result, a large unbalance is produced in two outputs from a 2-split light detector 7, and this 2-split light detector 7 is employed so as to detect a push-pull signal for a tracking operation. This may cause an offset in a tracking signal. If the lens is shifted, then the collected luminous flux entered into the disk is inclined, so that the spherical aberration distribution is also greatly deviated, and thus the aberration amount is relatively increased.

Figure 14A:
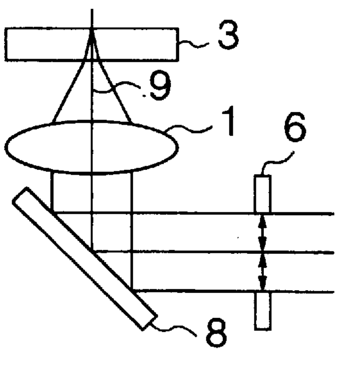
FIG. 14A and FIG. 14B are conceptual diagrams for showing an embodiment using a galvanometer mirror.
Figure 14B:
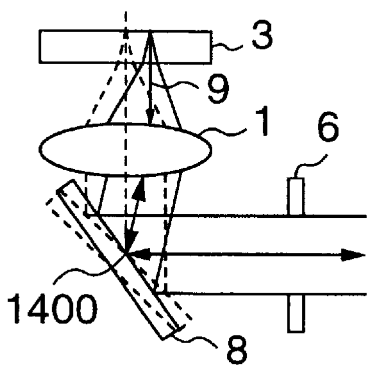

FIG. 14A and FIG. 14B show such a condition that when a galvanometer mirror 8 is arranged at a focal point of an objective lens, there is no shift in luminous flux of return light. When the galvanometer mirror 8 is located on a focal point 1400, main light 9 is merely moved in a parallel direction and the incident angle thereof is unchanged even if the galvanometer mirror 8 is inclined. If the disk is not inclined, then the main light 9 is vertically entered onto the disk, and then is directly returned via the incoming path after being reflected. As a consequence, there is no shift in the luminous flux. Therefore, it is very useful in the case that the objective lens according to the present invention is employed in combination with the diaphragm to thereby constitute an optical head.

Figure 15:
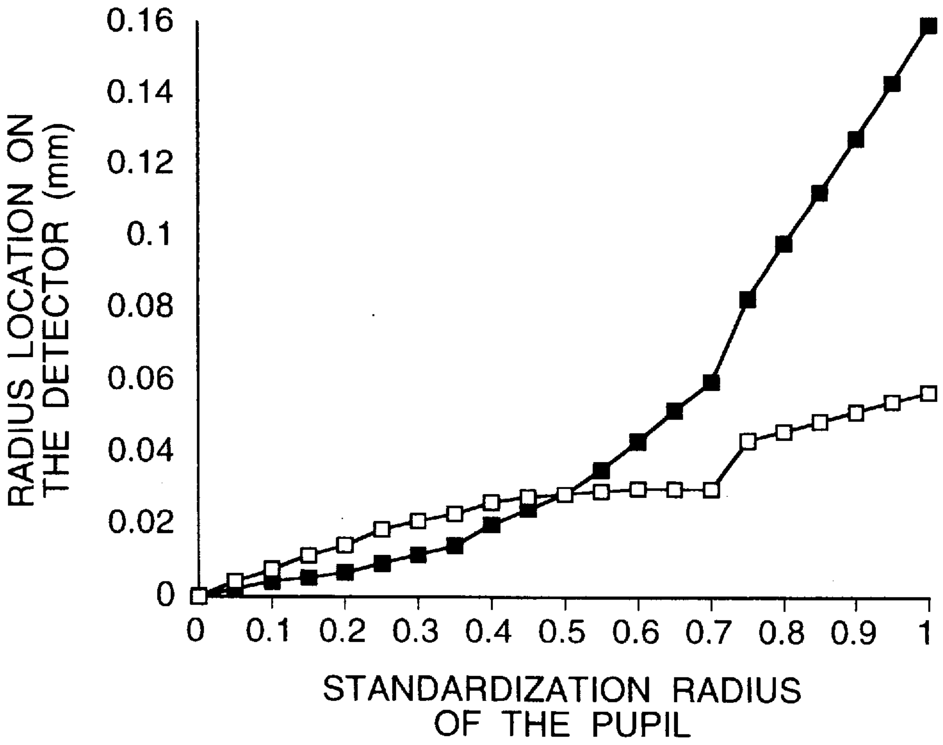
FIG. 15 is a graphic representation for showing a light position on a detector of a detecting optical system.

FIG. 15 indicates a calculation result of a radial position of light passing through a position of a light detector with respect to a standardization radius of an objective lens pupil under the following conditions. That is, when a limiting aperture is not employed and there is no diffraction by a disk, a wavelength is 0.635 μm; an objective lens is of NA 0.6; an effective luminous flux radius is 3.6 mm; a divisional radius rate is 0.7; an optimum substrate thickness of a central portion is 0.8 mm; an interval between the objective lens and a lens for condensing light to a detector is 60 mm; a diameter of a condenser lens is 5 mm; a focal distance of the condenser lens is 25 mm; and an interval between condenser lens detectors is 24.2 mm. According to this embodiment, when the detector is assumed as 0.14 mm, as to at least O-th order light, all light amount of the light can be detected while a DVD is reproduced except that the light at the peripheral portion is removed while a CD is reproduced. Also, as to diffraction light, since it can be seen that the light in the peripheral portion is greatly broadened with respect to the light in the central portion, it may be conceived that the light intensity is lowered and the influences are considerably reduced. As a consequence, practically speaking, when such an optical system and such a detector are designed, the light in the peripheral portion of the lens, which is unnecessary only during the CD reproduction, can be removed without employing the limiting aperture.

Figure 16:
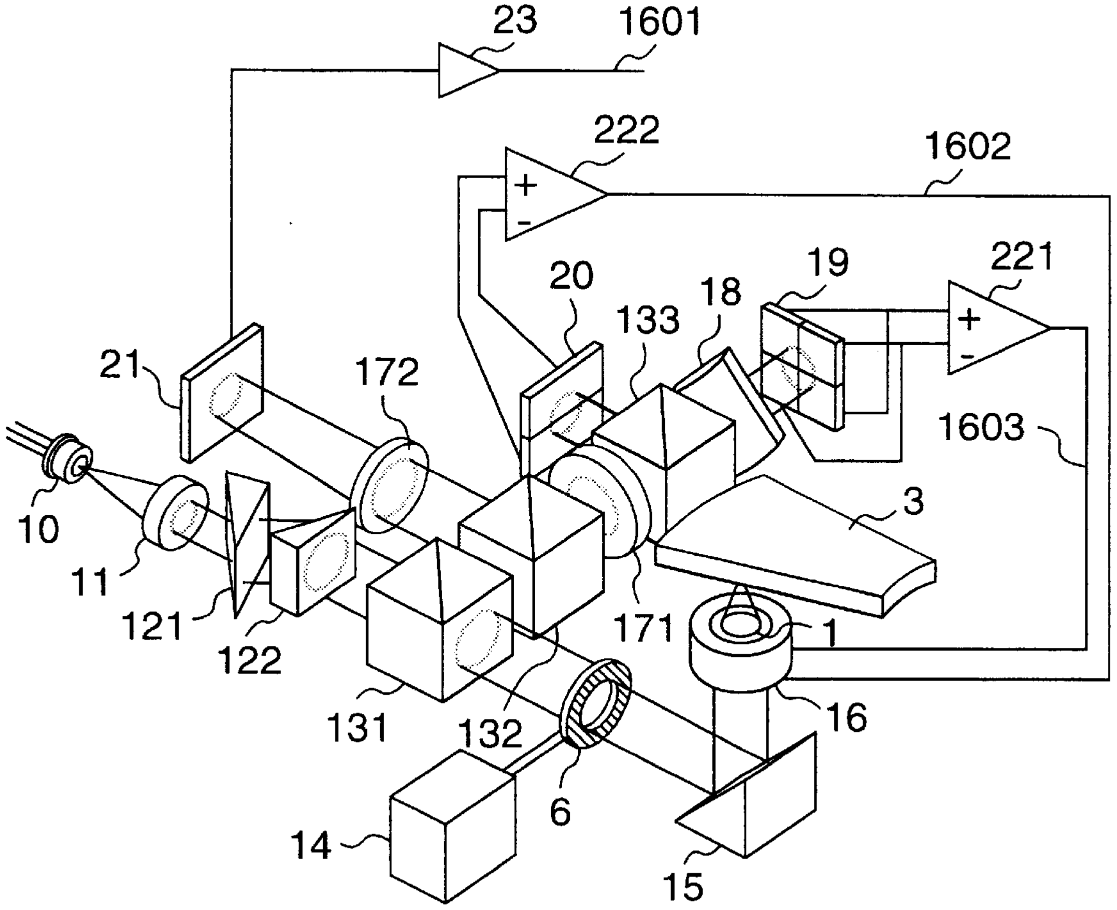
FIG. 16 is a perspective view for showing an optical head according to an embodiment of the present invention.

FIG. 16 is an optical head according to an embodiment of the present invention. Light emitted from a semiconductor laser 10 is converted into parallel light by a collimate lens 11, and an elliptical beam is converted into a circular beam by beam forming prisms 121 and 122. In such a case that the efficiency of the optical system is sufficiently high, or the track pitch of the disk is wider than an interval between the main robe of the light spot and the first dark line, if the beam forming prism is removed, then it becomes advantageous in order to reduce a total number of parts and crosstalk of adjoining tracks. Furthermore, this light passes through a beam splitter 131, and then passes through the diaphragm 6 equal to the limiting aperture. The diaphragm 6 is used so as to cut the light in the peripheral portion where the spherical aberration is large during the CD reproduction. This diaphragm 6 is removed from the optical path by a diaphragm inserting means 14 when the DVD is reproduced. Further, light reflected by a rising mirror 15 is collected onto the optical disk by the objective lens 1 mounted on a two-dimensional actuator 16. In this embodiment, the optical disk is the CD 3. In response to a tracking error signal 1602, the two-dimensional actuator 16 is moveable along the radial direction of the disk so as to position the light spot on the track, whereas in response to a focusing error signal 1603, the two-dimensional actuator 16 is moveable along the optical axis direction so as to position the focal position on the disk. The reflection light again passes through the objective lens 1, the rising mirror 15, and the diaphragm 6, and then is reflected on a beam splitter 131 to be thereby conducted to the detecting optical system. The light which has passed through the beam splitter 132 is converted into condensed luminous flux by a condenser lens 171, which will then be entered into another beam splitter 133. In this case, the transmission light passes through a cylindrical lens 18 and then is entered into a quadrature-split light detector 19. A differential signal obtained from summation signals of diagonal components of this quadrature-split light detector 19 is outputted from a differential amplifier 221 as a defocus signal 1603. On the other hand, such light reflected by the beam splitter 133 is entered into a 2-split light detector 20, and a differential signal obtained from the respective outputs thereof is derived from a differential amplifier 222, so that a tracking error signal 1602 is produced. Also, the light reflected on a beam splitter 232 is condensed by a condenser lens 172 to a photodetector 21, and then a reproduction signal 1601 is obtained from an amplifier 23.

Figure 17:
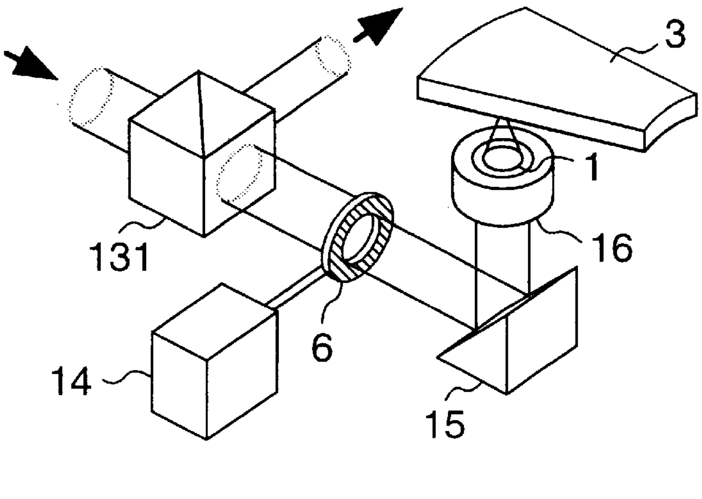
FIG. 17 is a perspective view for showing when a CD is reproduced with employment of a limiting aperture according to an embodiment.

FIG. 17 shows such a structure that only the optical system provided around this diaphragm is picked up, and the CD is reproduced.

Figure 18:
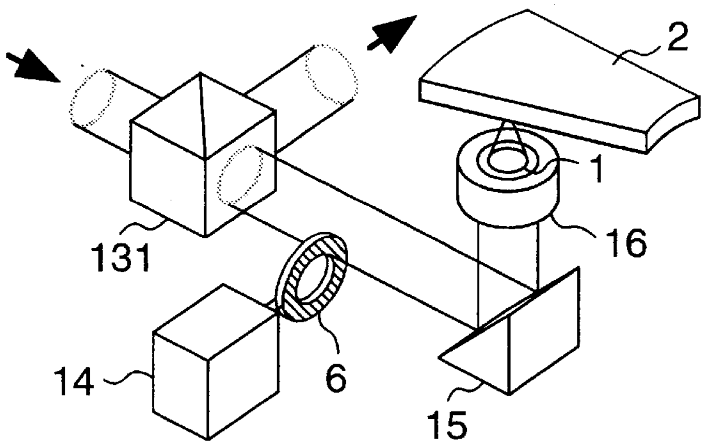
FIG. 18 is a perspective view for representing when a DVD is reproduced while removing a limiting aperture.

FIG. 18 represents another structure of the same optical system when the DVD is reproduced, in contrast with the above-described structure. The diaphragm 6 is inserted/removed by the diaphragm inserting means 14.

Figure 19A:
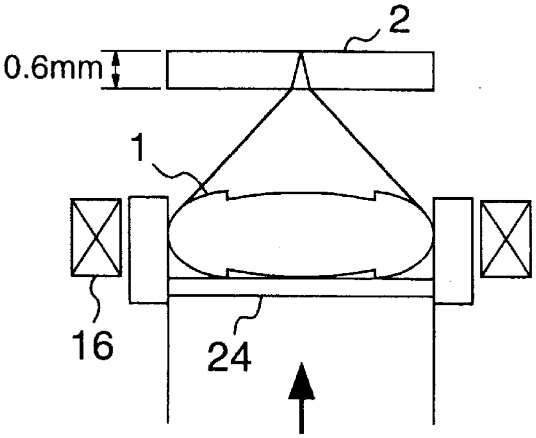
FIG. 19A and FIG. 19B are side views for indicating an embodiment such that a limiting aperture constituted by a liquid crystal filter is mounted on an actuator.
Figure 19B:
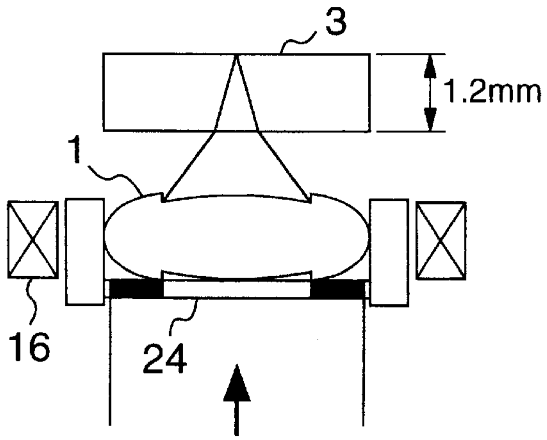

FIG. 19A and FIG. 19B show another embodiment in which a limiting aperture, namely a diaphragm is mounted on an objective lens actuator. The actuator is driven by a coil 16 and the like. In this case, a liquid crystal element 24 is employed as the diaphragm. When a DVD having a substrate thickness of 0.6 mm is reproduced, no voltage is applied to the liquid crystal element, and the incident light passes through the entire surface of the liquid crystal element 24. When a CD having a substrate thickness of 1.2 mm is reproduced, a voltage is applied to the liquid crystal element so as to interrupt the light in the peripheral portion, and this liquid crystal element may function as the diaphragm. With employment of this arrangement, the limiting aperture does not produce eclipse even when the lens is moved in accordance with the disk deviation.

Figures 20, 21A, 21B:
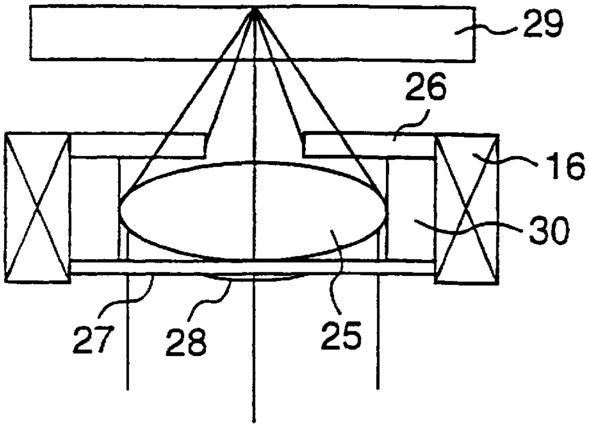
FIG. 20 is a side view for showing parallel plane plates having holes at centers thereof according to an embodiment.
FIG. 21A and FIG. 21B are tables for indicating a lens design specification and a design shape with a lens refraction index of 1.49.

FIG. 20 represents an embodiment in such a case that a difference between an optimum substrate thickness of a central portion of a lens and that of a peripheral portion thereof is produced by a parallel plate 26 having a hole at a center thereof. The parallel plate 26 having a substrate thickness of 0.2 mm and a hole formed in a central portion thereof is inserted into condensed luminous flux of an objective lens 25 on the side of a disk 29, which is optimized with respect to the substrate thickness of 0.8 mm. As a result, the central portion is optimized with respect to the substrate thickness of 0.8 mm, and the peripheral portion is optimized with respect to the substrate thickness of 0.6 mm. In this case, in order to make a shape of spherical aberration occurred only in the central portion when the DVD having the substrate thickness of 0.6 mm is reproduced coincident with the shape of the Zernike's spherical aberration indicated in the formula 8, both defocus and a phase shift should be applied to the central portion. In this case, a phase shifter 27 formed with a phase shift film 28 is made in an integral form in order to apply the defocus and the phase shift.

A detailed description will now be made of designing of the actual lens shapes, since the lens shapes have been designed as to three sorts of lens material refraction indexes in accordance with the above-explained design specifications, taking account of selection free degrees in the lens material.

FIG. 21A and FIG. 21B are diagrams for explaining a design example when the lens refraction index is selected to be 1.49.

FIG. 21A and FIG. 21B show an example of a lens design condition and a design shape according to the present invention. In this example, a lens shape is expressed by the following expression 12, assuming that a coordinate value of the lens along an optical axis direction is "z", symbol "R" indicates a central radius curvature; symbol "K" indicates a conic constant; and symbols "α1", "α2", "α3",—denote a 4th-order aspherical surface constant, 6th-order aspherical surface constant, 8th-order aspherical surface constant,—respectively:

$$z = \frac{\rho^2}{R + \sqrt{R^2 - (K+1)\rho^2}} + \alpha_1\rho^4 + \alpha_2\rho^6 + \alpha_3\rho^8 + \alpha_4\rho^{10} + - - - . \tag{12}$$

A stepped portion in a boundary portion of the lens is 0.14 μm, i.e., very small. As indicated in the expression 10, this is determined from such a fact that the stepped portion produces a phase difference equal to a 1/6 aberration coefficient of the Seidel's spherical aberration. In this case, the spherical aberration coefficient is equal to 0.93λ under NA 0.42, and a stepped portion corresponding thereto is 0.17 μm. Since the actual lens design is carried out taking account of the axial outside performance, a small shift may occur. But, orders are substantially coincident with each other. It is assumed that a radius of an R1 surface is 3.1 mm, and a zag deviation amount is 0.14 μm, a central portion being deep.

Figure 22:
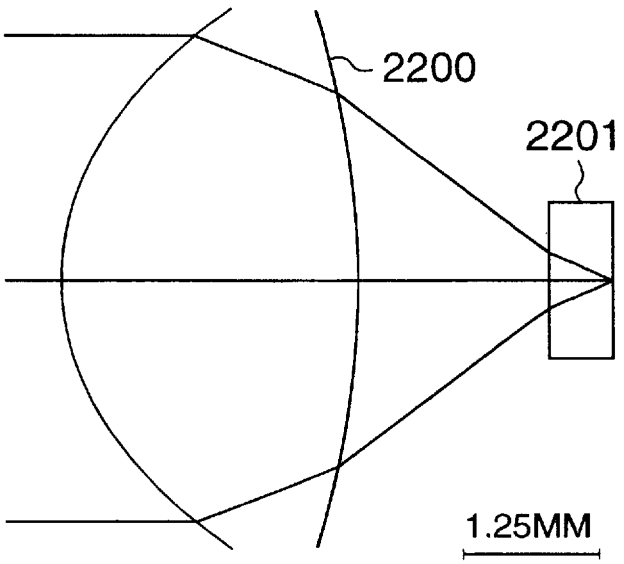
FIG. 22 is an optical system structural diagram when a DVD is reproduced for the lens design example having a lens refraction index of 1.49.
Figure 23:
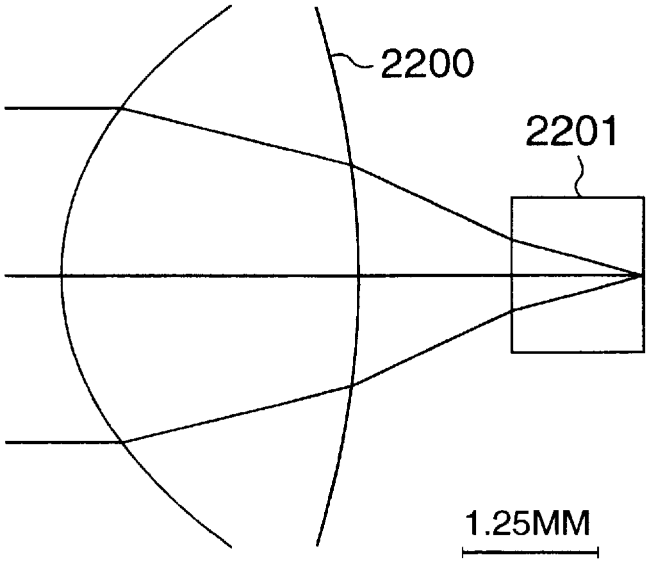
FIG. 23 is an optical system structural diagram when a CD is reproduced for the lens design example having a lens refraction index of 1.49.
Figure 24A:
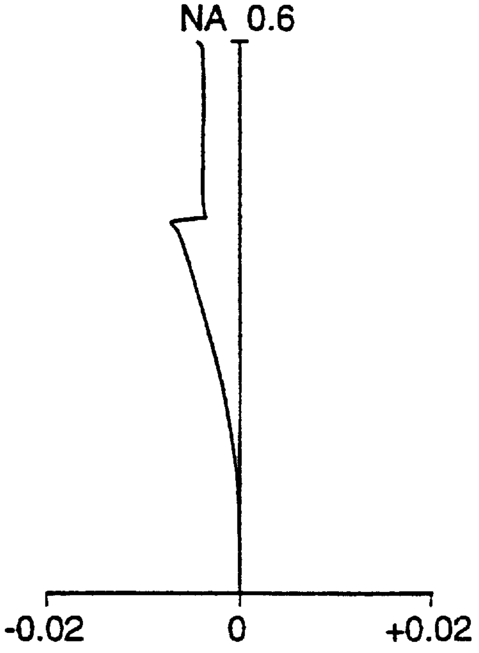
FIG. 24A, FIG. 24B, FIG. 24C, and FIG. 24D are graphic representations of aberration when the DVD is reproduced for the lens design example having a lens refraction index of 1.49.
Figure 24B:
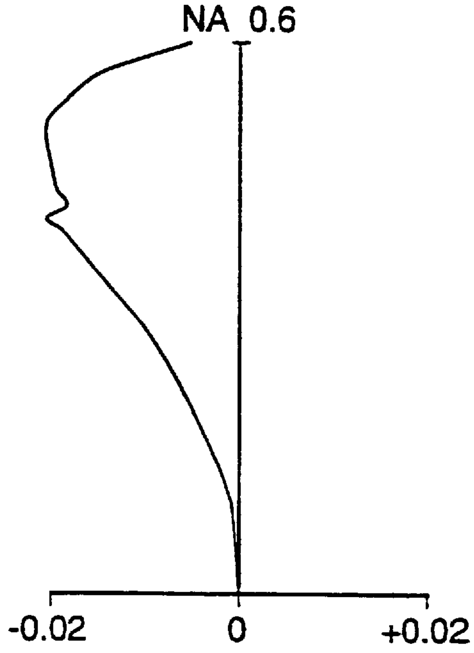
Figure 24C:
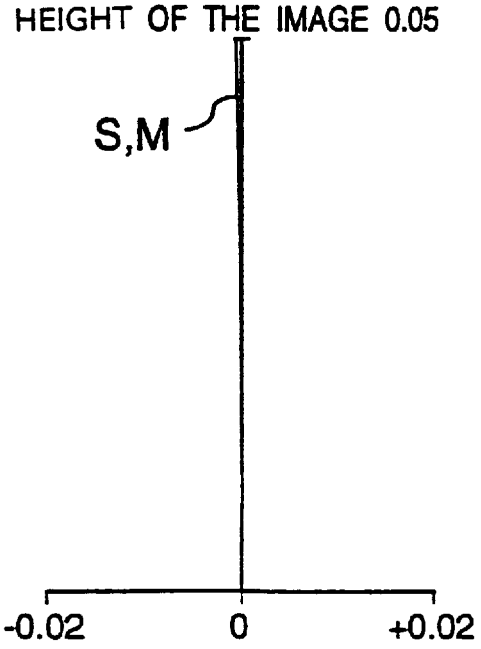
Figure 24D:
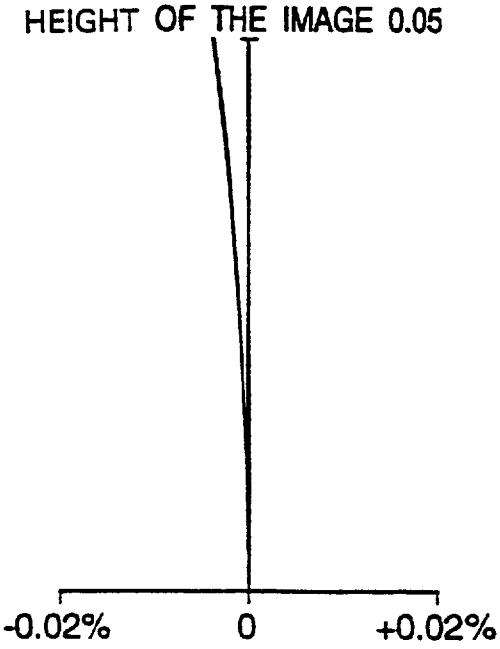
Figure 25A:
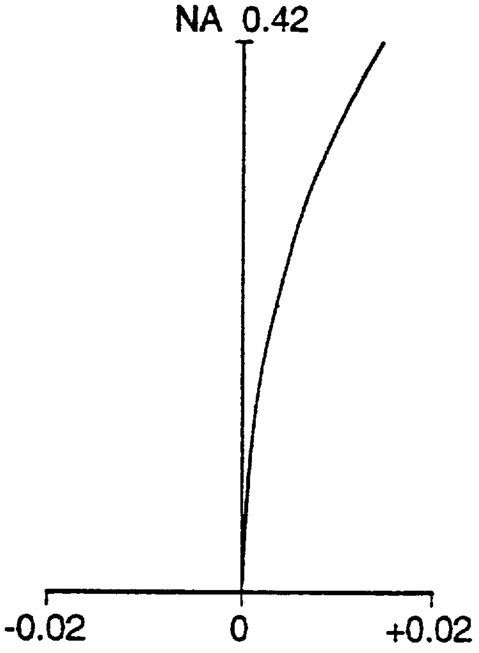
FIG. 25A, FIG. 25B, FIG. 25C, and FIG. 25D are graphic representations of aberration when the CD is reproduced for the lens design example having a lens refraction index of 1.49.
Figure 25B:
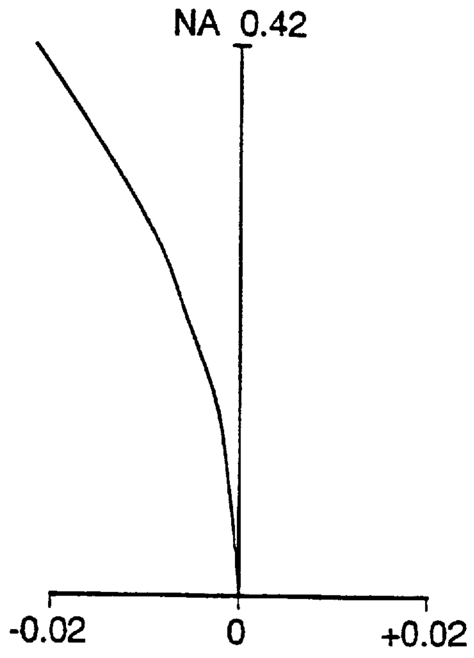
Figure 25C:
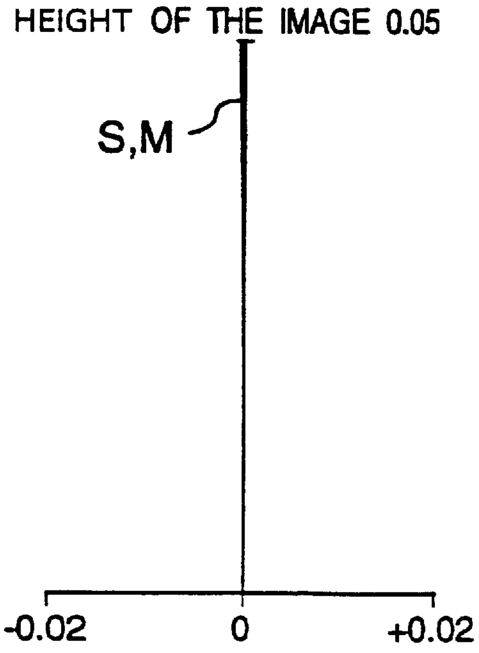
Figure 25D:
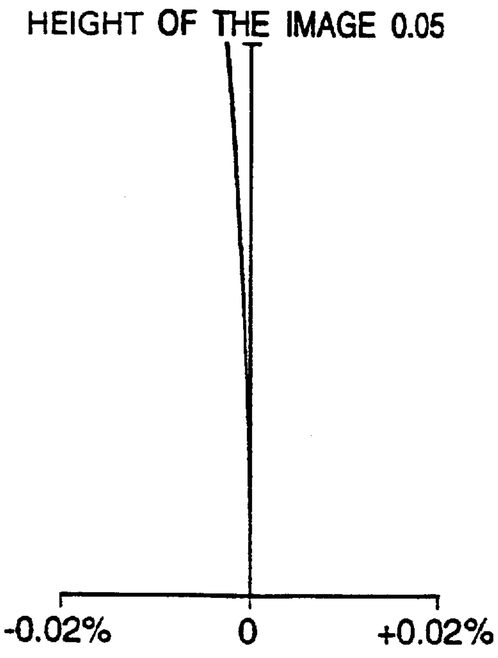

In such a case that the DVD and the CD are reproduced by employing this component, a structure of a lens curved surface 2200 and an optical disk 2201 is indicated in FIG. 22 and FIG. 23. Aberration diagrams in the respective cases are indicated in FIG. 24A, FIG. 24B, FIG. 24C, FIG. 24D, and FIG. 25A, FIG. 25B, FIG. 25C, FIG. 25D. FIG. 24A and FIG. 25A show spherical aberration; FIG. 24B and FIG. 25B indicate sine conditions; FIG. 24C and FIG. 25C represent astigmatism; and further FIG. 24D and FIG. 25D denote distortion aberration. The spherical aberration in this example is not equal to the previously mentioned wave front aberration, but is expressed by light aberration for indicating a shift of a position where light is intersected with an optical axis. The sine condition indicates a difference amount thereof with respect to a pupil radius. Normally, in an object lens for an optical disk, this sine condition is in a range of ±0.015 mm in the design aspect. In this example, this sine condition is slightly greater than this design range due to the spherical aberration. However, as will be indicated in wave front aberration, this may be present within an allowable range. Both the astigmatism and the distortion aberration are indicated with respect to image heights when the parallel light incident upon the lens is inclined. The astigmatism is very small, and thus owns a practically sufficient performance. Originally, the distortion aberration has no problem in such an optical system that an image is present only at one point, such as the conventional optical disk. When an optical head of multispot is required in future, this point will be considered. Also, in this future case, a substantially sufficient performance may be achieved.

Figure 26:
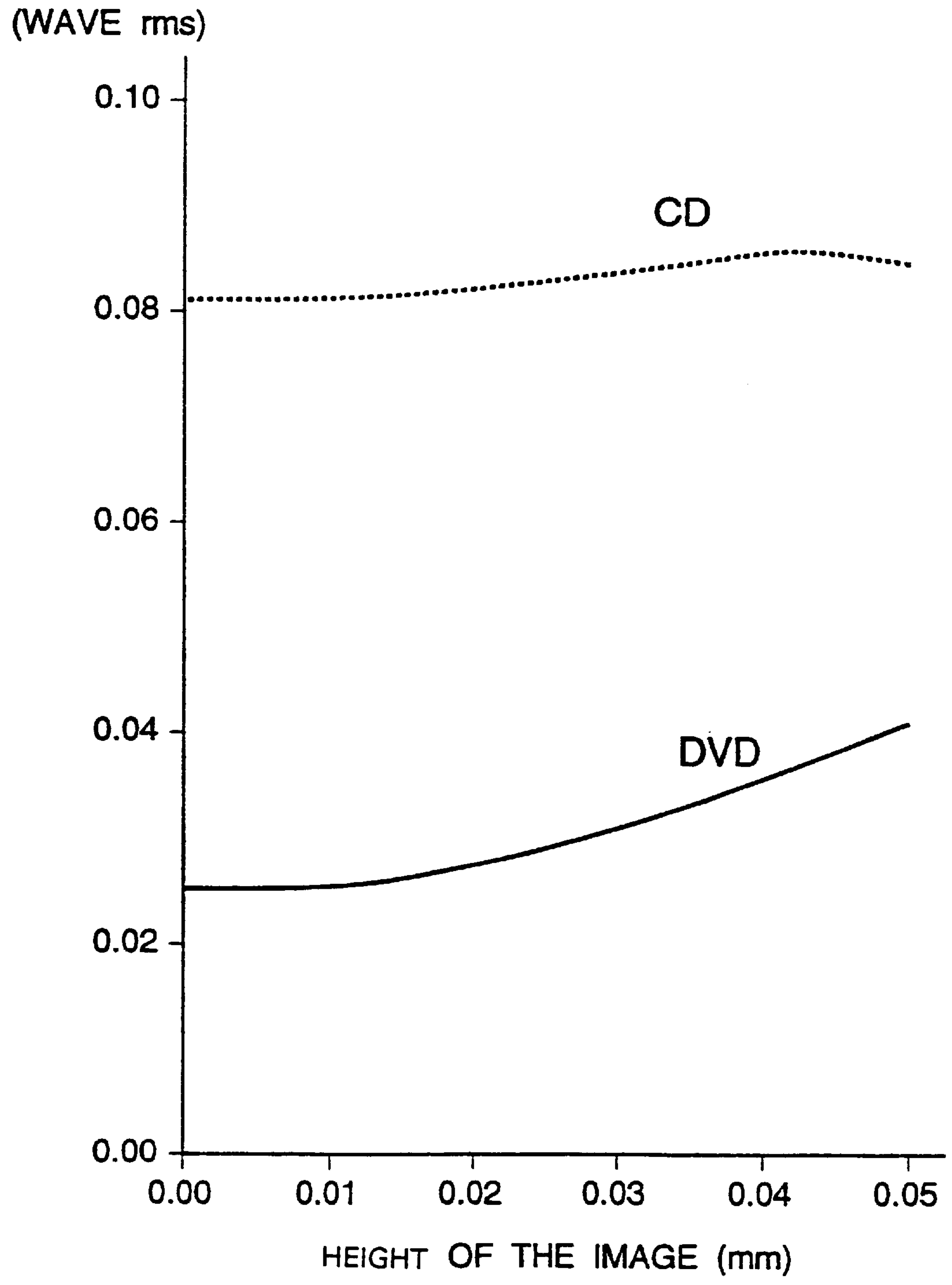
FIG. 26 is a graphic representation of RMS wave front aberration for the lens design example having a lens refraction index of 1.49.
Figure 28:
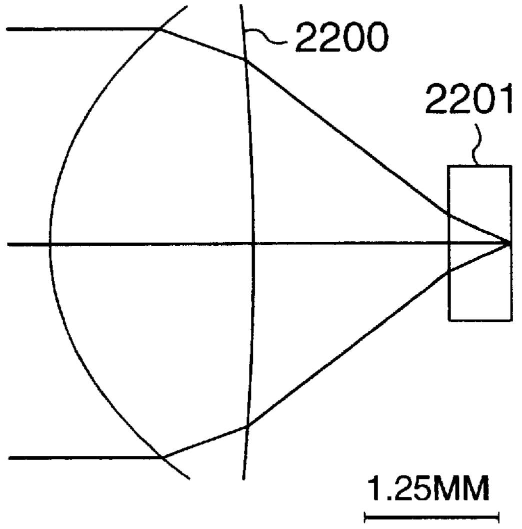
FIG. 28 is a optical system structural diagram when an DVD is reproduced for the lens design example having a lens refraction index of 1.59.
Figure 29:
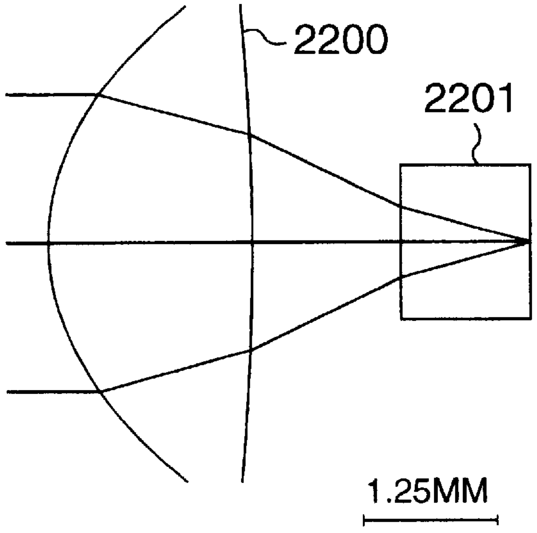
FIG. 29 is an optical system structural diagram when a CD is reproduced for the lens design example having a lens refraction index of 1.59.

Furthermore, FIG. 26 shows root mean square wave front aberration with respect to a height of an image when light is entered into a lens along an oblique direction. As also shown in FIG. 21A and FIG. 21B, in this case, wave front aberration on the axis is 0.025λ for a DVD, and wave front aberration on the axis is 0.081λ for a CD. As previously described, as to the DVD, the wave front aberration on the axis can satisfy the condition lower than 0.04λ. As to the CD, since the wave front aberration is 0.081λ and the Strehl intensity is 1−(2π×0.081)2=0.741, when a performance factor is calculated, this PF becomes 0.741×[0.42/0.635(μm)×sin (0.26π/0.635)]$^2$=0.299. This PF becomes larger than 0.24, and thus can satisfy the allowable value. An analysitical prediction may be made that the wave front aberration on the optical axis of the CD is on the order of 0.07λ in this case. Since the axial outside performance is also considered in the lens design, this wave front aberration on the optical axis slightly becomes larger than this value.

Similar to FIG. 21A and FIG. 21B, FIG. 27A and FIG. 27B are an example of a lens design condition and a design shape according to the present invention.

Similar to FIG. 22 and FIG. 23, FIG. 28 and FIG. 29 are diagrams for indicating a structure when the DVD and the CD are reproduced by employing this designed lens.

Figure 30A:
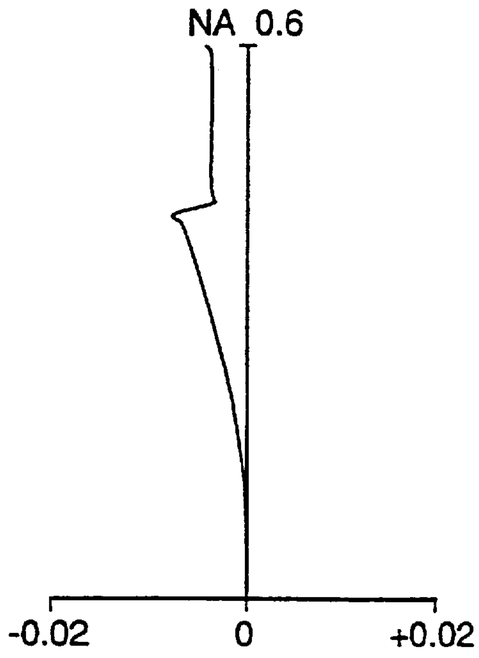
FIG. 30A, FIG. 30B, FIG. 30C, and FIG. 30D are graphic representations of aberration when the DVD is reproduced for the lens design example having a lens refraction index of 1.59.
Figure 30B:
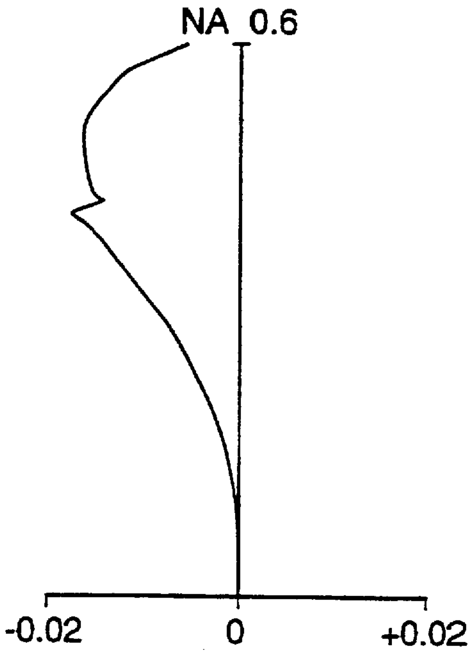
Figure 30C:
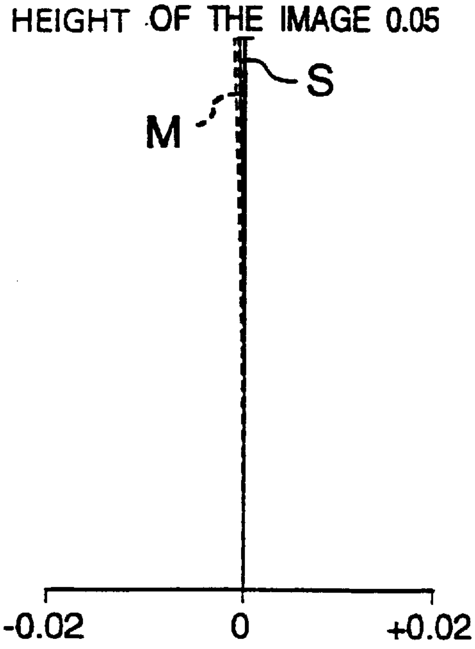
Figure 30D:
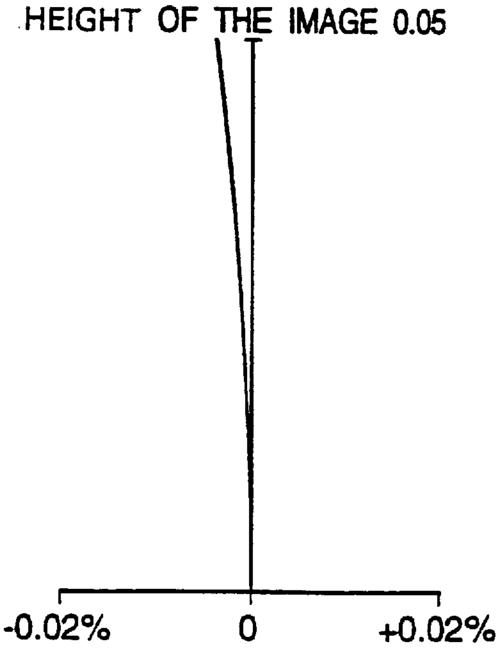
Figure 31A:
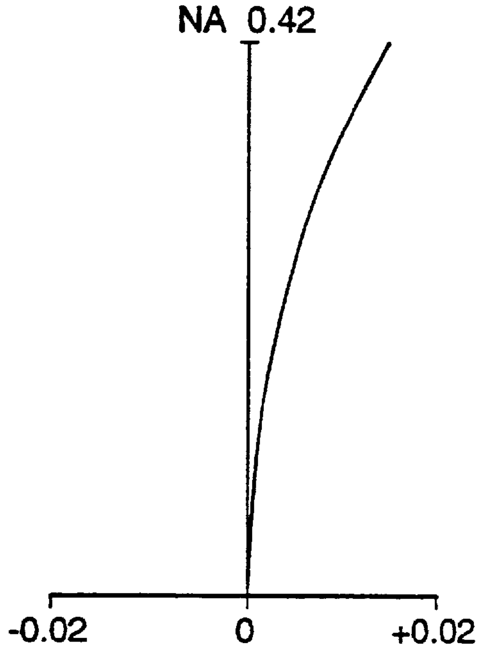
FIG. 31A, FIG. 31B, FIG. 31C, and FIG. 31D are graphic representations of aberration when the CD is reproduced for the lens design example having a lens refraction index of 1.59.
Figure 31B:
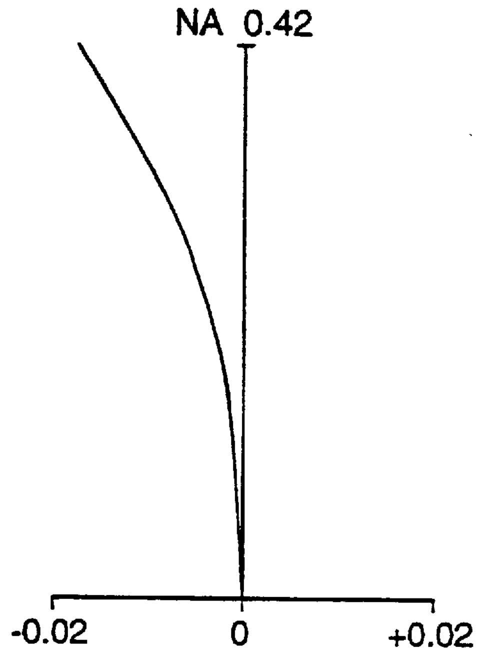
Figure 31C:
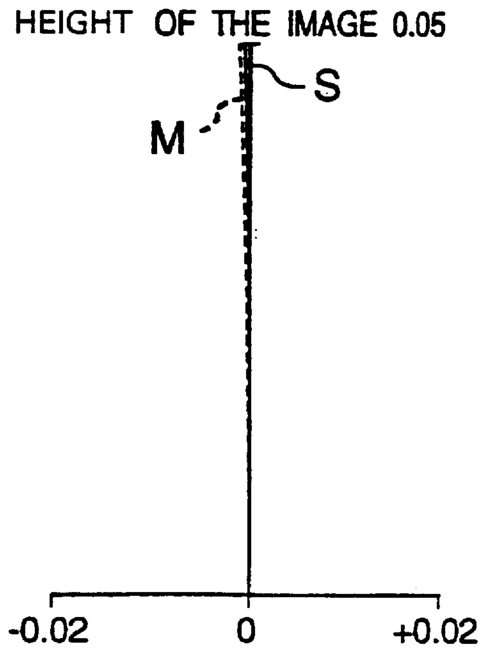
Figure 31D:
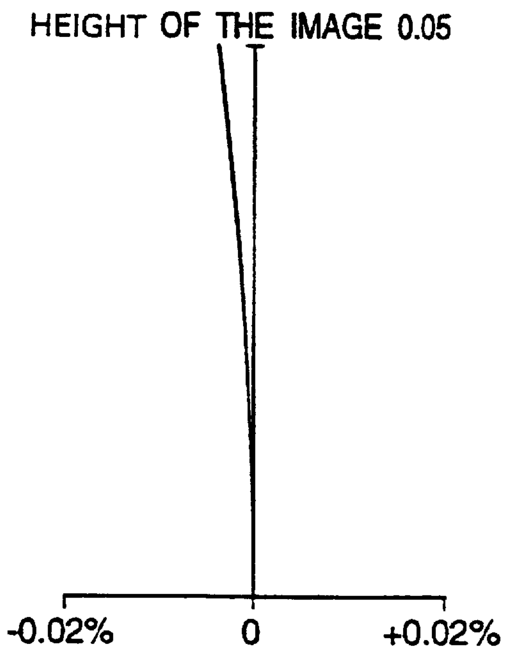

Similar to FIG. 24 and FIG. 25, aberration diagrams in the respective cases are indicated in FIG. 30A, FIG. 30B, FIG. 30C, FIG. 30D, and FIG. 31A, FIG. 31B, FIG. 31C, FIG. 31D. FIG. 30A and FIG. 31A show spherical aberration; FIG. 30B and FIG. 31B indicate sine conditions; FIG. 30C and FIG. 31C represent astigmatism; and further FIG. 30D and FIG. 31D denote distortion aberration.

Figure 32:
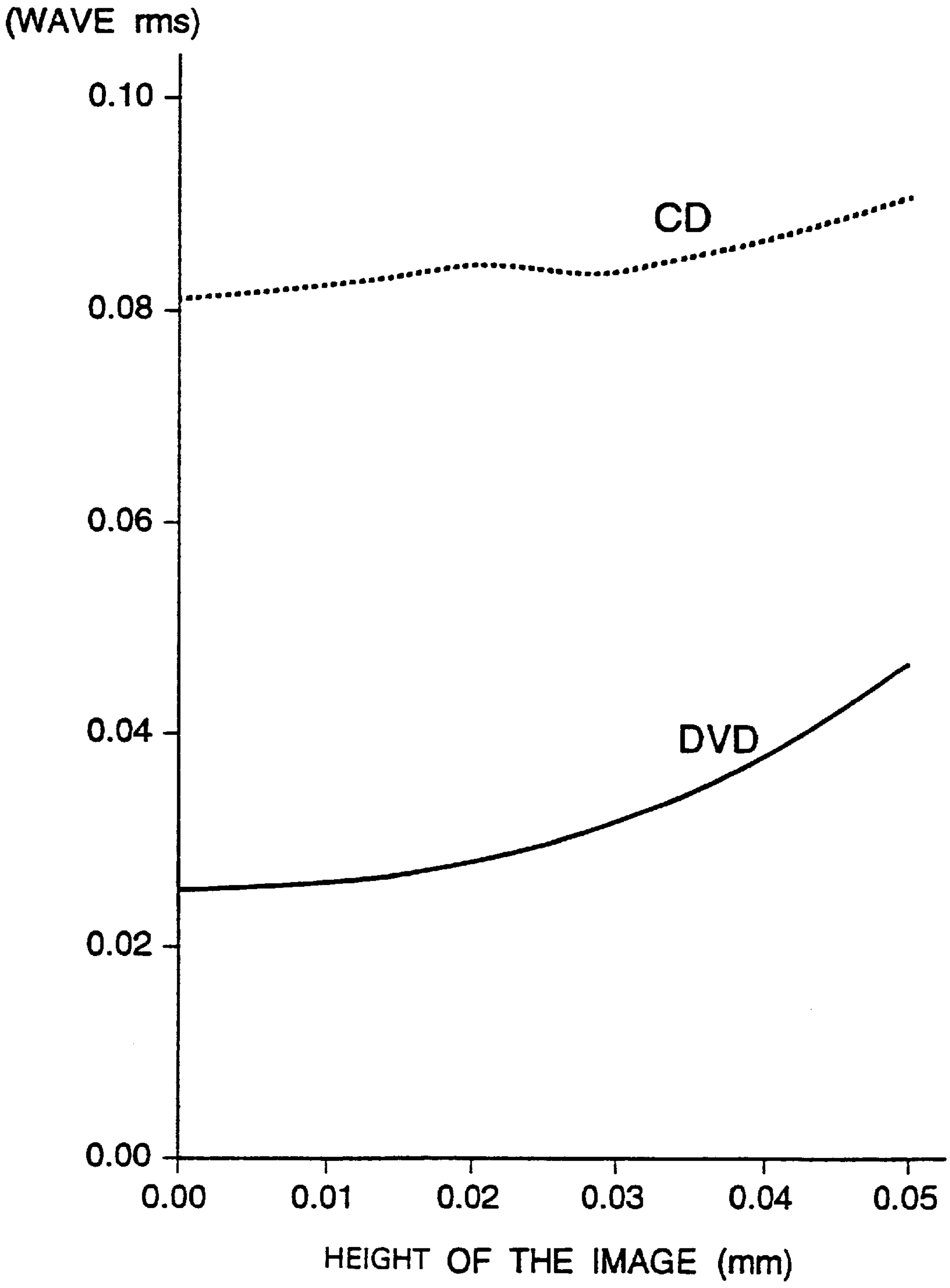
FIG. 32 is a graphic representation of RMS wave front aberration for the lens design example having a lens refraction index of 1.59.
Figure 34:
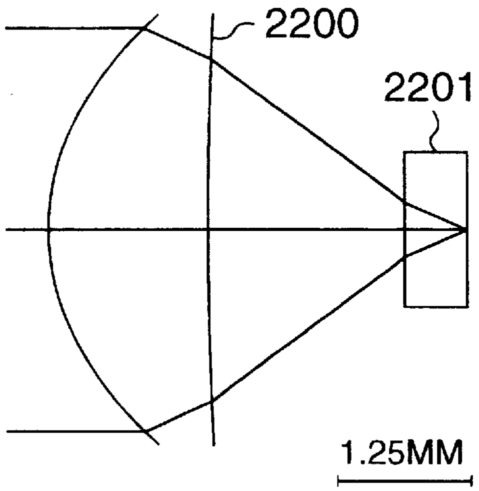
FIG. 34 is an optical system structural diagram when a DVD is reproduced for the lens design example having a lens refraction index of 1.73.
Figure 35:
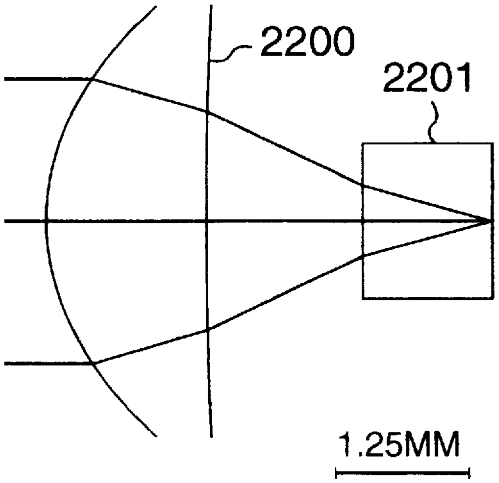
FIG. 35 is an optical system structural diagram when a CD is reproduced for the lens design example having a lens refraction index of 1.73.

FIG. 32 shows root mean square wave front aberration with respect to a height of an image when light is entered into a lens along an oblique direction. As also shown in FIG. 21, in this case, wave front aberration on the axis is 0.025λ for a DVD, and wave front aberration on the axis is 0.082λ for a CD. As previously described, as to the DVD, the wave front aberration on the axis can satisfy the condition lower than 0.04λ. As to the CD, since the wave front aberration is 0.082λ and the Strehl intensity is 1−(2π×0.082)$^2$=0.735, when a performance factor is calculated, this PF becomes 0.735×[0.42/0.635(μm)×sin (0.26π/0.635]$^2$=0.296. This PF becomes larger than 0.24, and thus can satisfy the allowable value.

Figure 38:
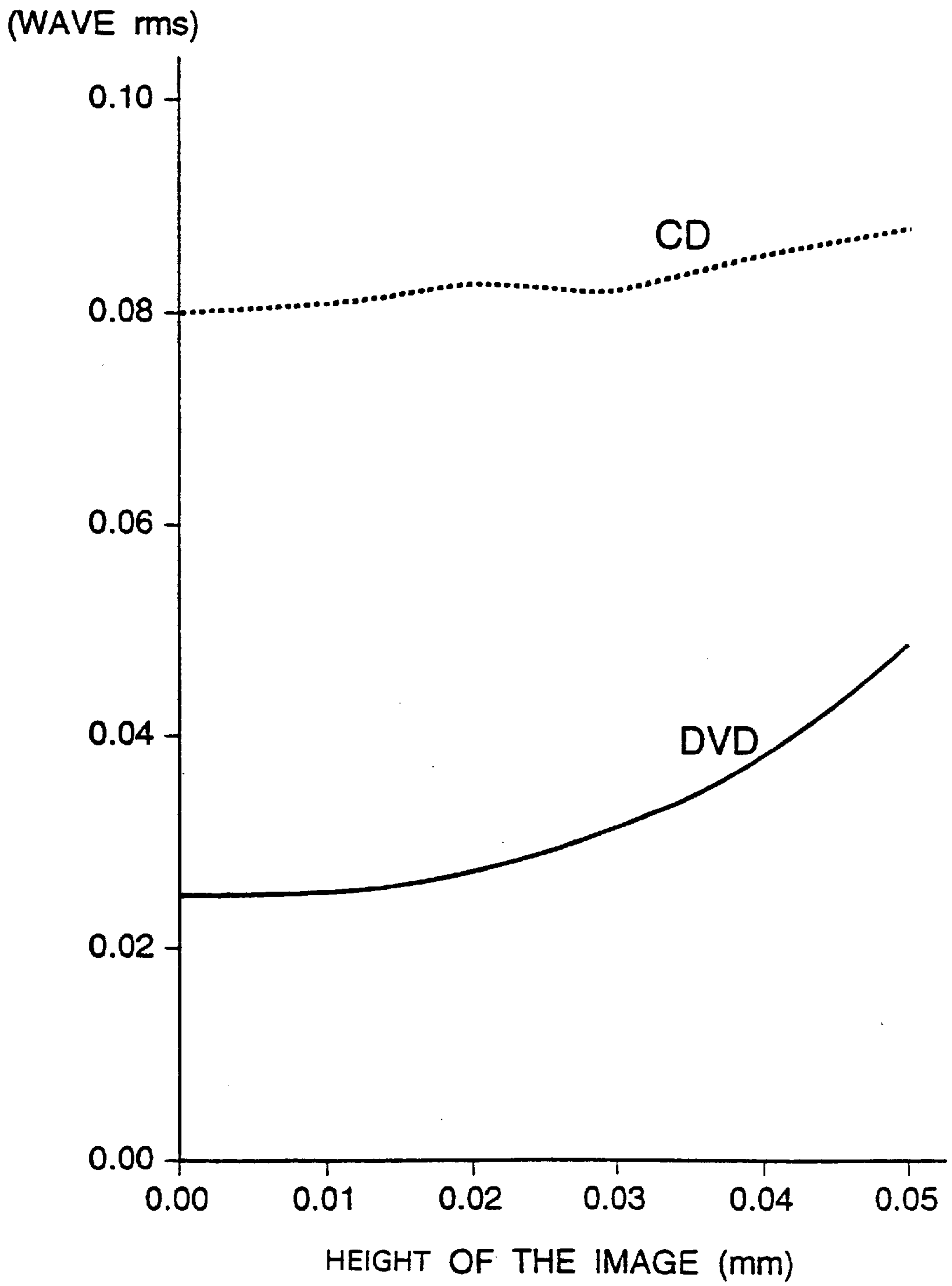
FIG. 38 is a graphic representation of RMS wave front aberration for the lens design example having a lens refraction index of 1.73.

FIG. 33A, FIG. 33B, to FIG. 38 are diagrams related to design examples in the case that the refraction index of the lens is selected to be 1.73, and it can be seen that these lenses may be designed to have a performance similar to the above-described case.

Similar to FIG. 21A and FIG. 21B, FIG. 33A and FIG. 33B are an example of a lens design condition of a lens design condition and a design shape according to the present invention.

Similar to FIG. 22 and FIG. 23, FIG. 34 and FIG. 35 are diagrams for indicating a structure when the DVD and the CD are reproduced by employing this designed lens.

Figure 36A:
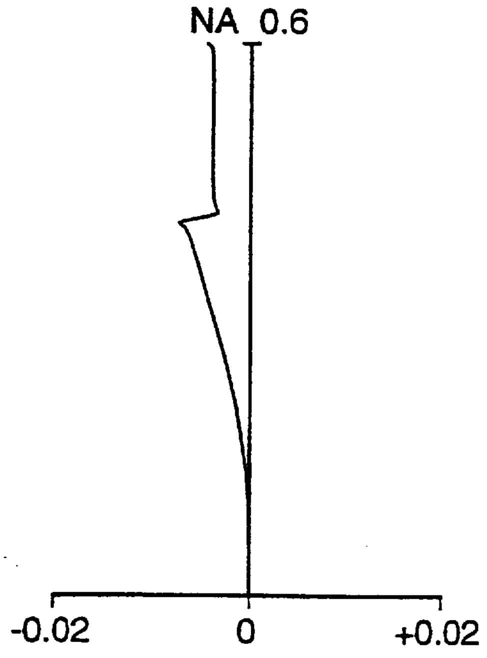
FIG. 36A, FIG. 36B, FIG. 36C, and FIG. 36D are graphic representations of aberration when the DVD is reproduced for the lens design example having a lens refraction index of 1.73.
Figure 36B:
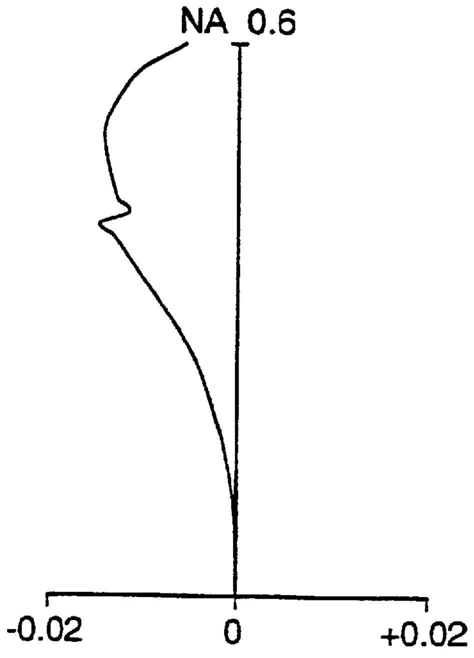
Figure 36C:
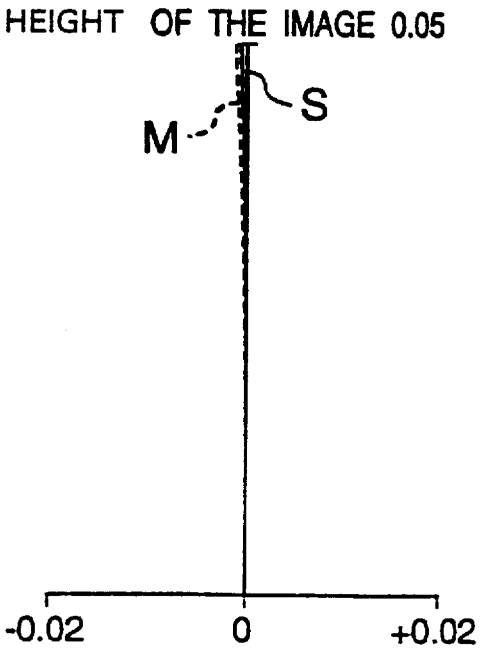
Figure 36D:
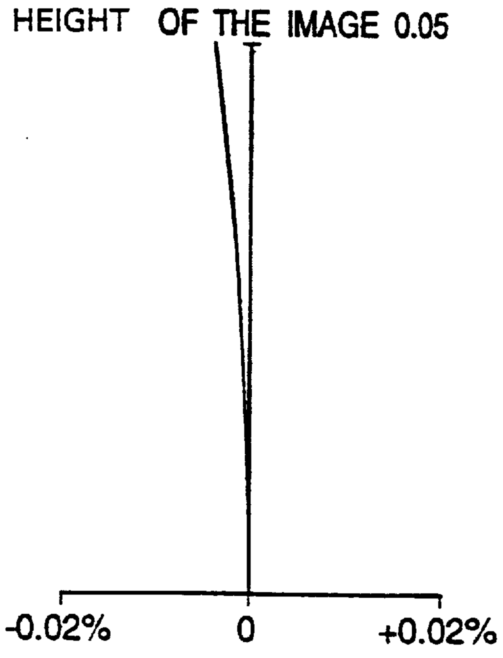
Figure 37A:
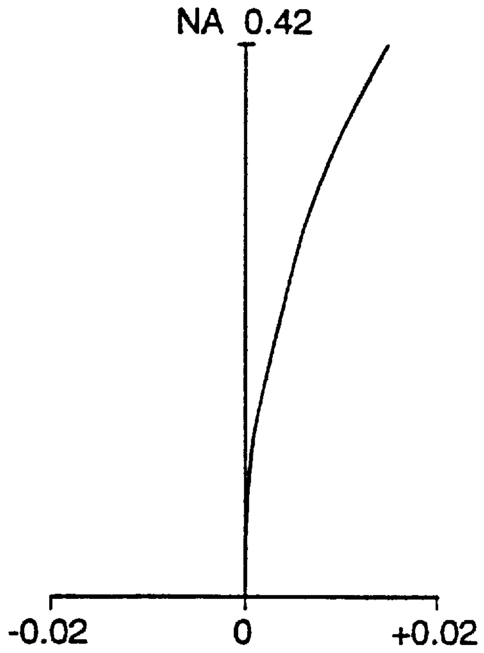
FIG. 37A, FIG. 37B, FIG. 37C, and FIG. 37D are graphic representations of aberration when the CD is reproduced for the lens design example having a lens refraction index of 1.73.
Figure 37B:
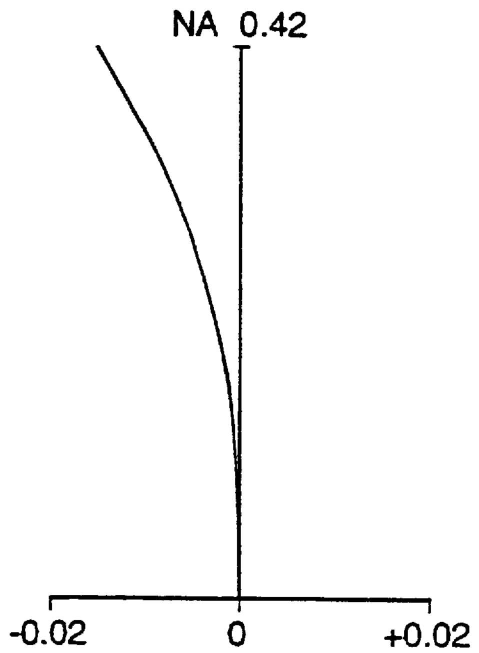
Figure 37C:
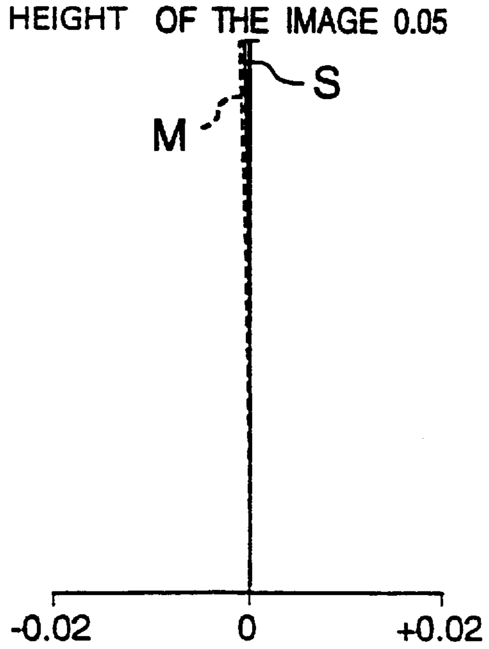
Figure 37D:
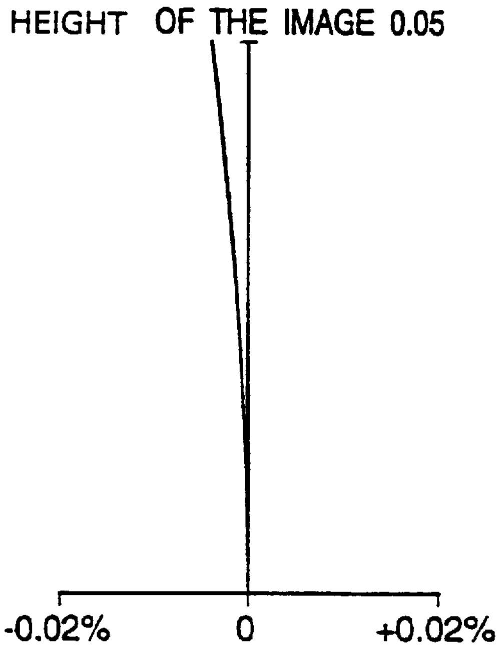

Similar to FIG. 24A, FIG. 24B, FIG. 24C, FIG. 24D, and FIG. 25A, FIG. 25B, FIG. 25C, FIG. 25D, aberration diagrams in the respective cases are indicated in FIG. 36A, FIG. 36B, FIG. 36C, FIG. 36D, and FIG. 37*a,* FIG. 37B, FIG. 37C, FIG. 37D. FIG. 36A and FIG. 37A show spherical aberration; FIG. 36B and FIG. 37B indicate sine conditions; FIG. 36C and FIG. 37C represent astigmatism; and further FIG. 36D and FIG. 37D denote distortion aberration.

Furthermore, FIG. 38 shows root mean square wave front aberration with respect to a height of an image when light is entered into a lens along an oblique direction. As also shown in FIG. 21, in this case, wave front aberration on the axis is 0.025λ for a DVD, and wave front aberration on the axis is 0.082λ for a CD. As previously described, as to the DVD, the wave front aberration on the axis can satisfy the condition lower than 0.04λ. As to the CD, since the wave front aberration is 0.080λ and the Strehl intensity is 1−(2π×0.082)$^2$=0.747, when a performance factor is calculated, this PF becomes 0.747×[0.42/0.635(μm)×sin (0.26π/0.635)]$^2$=0.301. This PF becomes larger than 0.24, and thus can satisfy the allowable value.

The signal from the CD having the substrate thickness of 1.2 mm, and the signal from the DVD having the substrate thickness of 0.6 mm can be precisely reproduced in low cost without any loss of the light amount.

We claim:

1. An optical head comprising: a light source; an objective lens for focusing light from said light source to an optical information recording medium; a light branching element for branching reflection light reflected from an optical recording medium from a light path returned to the light source; a photodetector; and means for positioning a focusing spot onto an information pit array of the optical recording medium; wherein:

a root mean square wave front aberration $W_{rms}$, a wavelength $\lambda_2$ of the light source, and a numerical aperture $NA_2$ of the objective lens satisfy;

$$\left\{1-\left(\frac{2\pi}{\lambda_2}W_{rms}\right)^2\right\}\left(\frac{NA_2}{\lambda_2}\right)^2\sin^2\left(\frac{2n_2\pi d}{\lambda_2}\right)\geqq\left(\frac{NA_1}{\lambda_1}\right)^2\sin^2\left(\frac{2n_1\pi d}{\lambda_1}\right)$$

where "$n_1$" and "$n_2$" are refractive indices of an information recording medium substrate with respect to wavelengths $\lambda_1$ and $\lambda_2$; "d" denotes a depth of an information pit; a light source wavelength of an optical head for recording or reproducing information from said optical information recording medium is under such a degree that aberration can be optically neglected; and the root mean square wave front aberration can be optically neglected for a numerical aperture $NA_1$.

2. An objective lens for focusing laser light onto an information recording film surface in order to record or reproduce information on or from an optical information recording medium for optically recording/reproducing the information, wherein:

a thickness of said objective lens for focusing said laser light independently having aberration of the same conditions is different at a central portion and a peripheral portion thereof.

3. An objective lens as claimed in claim 2, focusing laser light having a wavelength of $\lambda_2$ on the information recording film surface in order to record or reproduce the information from two sorts of optical information recording mediums having different substrate thicknesses, different information pit hole depths, and different recording densities; wherein:

a peripheral portion of the objective lens generates no aberration when the laser light is focused through a substrate thickness of a first optical information recording medium having a large recording density; a central portion of the objective lens generates no aberration when the laser light is focused through a substrate thickness of a second optical information recording medium having a low recording density; a focused spot root mean square wave front aberration of incident light in combination with light passing through the central portion is lower than or equal to approximately 0.04 times a wavelength of laser light under use with respect to the substrate of the first optical information recording medium; and while recording or reproducing the second optical information recording medium by way of light passing only through the central portion of the objective lens, a numerical aperture $NA_2$ only about the central portion, a substrate thickness by which the light of said central portion is collected without any aberration, and also wave front aberration $W_{rms}$ caused by an error in the substrate thickness of the second optical information recording medium substantially satisfies the following formula in comparison with an optical head having a light source wavelength $\lambda_1$ under which information is optically recorded on or reproduced from the second optical information recording medium without any aberration under better conditions, using a normal objective lens of a numerical aperture $NA_1$:

$$\left\{1-\left(\frac{2\pi}{\lambda_2}W_{rms}\right)^2\right\}\left(\frac{NA_2}{\lambda_2}\right)^2\sin^2\left(\frac{2n_2\pi d}{\lambda_2}\right)\geq\left(\frac{NA_1}{\lambda_1}\right)^2\sin^2\left(\frac{2n_1\pi d}{\lambda_1}\right)$$

where "$n_1$" and "$n_2$" denote refraction indices of an information recording substrate with respect to the wavelengths $\lambda_1$ and $\lambda_2$, respectively.

4. An objective lens as claimed in claim 3 wherein the substrate thickness of the second optical information recording medium is approximately 1.2 mm, and substantially satisfies the following expression:

$$\left\{1-\left(\frac{2\pi}{\lambda_2}W_{rms}\right)^2\right\}\left(\frac{NA_2}{\lambda_2}\right)^2\sin^2\left(\frac{0.26\pi}{\lambda_2}\right)\geq 0.24(1/\mu m^{-2})$$

5. An objective lens as claimed in claim 2 wherein said objective lens substantially satisfies the Abbe's sine condition as an overall objective lens.

6. An objective lens as claimed in claim 2 wherein a shape of a boundary portion between the peripheral portion and the central portion is smoothly connected.

7. An objective lens as claimed in claim 2 wherein an optimum substrate thickness of the central portion is continuously variable in a coaxial shape from a lens center.

8. An objective lens as claimed in claim 2 wherein a thin film is loaded on either the peripheral portion or the central portion.

9. An objective lens as claimed in claim 2 wherein said objective lens is arranged by a lens whose substrate thickness is optimized over an entire surface, and a parallel plate arranged on the object side of the lens, a hole being formed in a central portion of said parallel plate.

10. An objective lens as claimed in claim 2 wherein a paraxial focus of the objective lens on the side of the light source is separated from a surface of the objective lens on the side of the light source by greater than or equal to 2 mm.

11. An optical head comprising: a light source; the objective lens recited in claim 10, for focusing light from said light source to an optical recording medium; a light branching element for branching reflection light reflected from an optical recording medium from a light path returned to the light source; a photodetector; and means for positioning a focused light spot onto an information pit array of the optical recording medium; wherein:

in order to reproduce information recorded on a substrate having a thickness of 1.2 mm, the optical head further comprises means for reducing a light amount of light or for interrupting the light entered into a peripheral portion of the objective lens; and a galvanometer mirror employed as an actuator for tracking the focused light spot to the information pit array on the optical recording medium; wherein a rotary shaft of the galvanometer mirror is arranged near the paraxial focus of said objective lens on the side of the laser light source.

12. An optical head for recording or reproducing information by employing an objective lens for focusing laser light onto an information recording film surface in order that information is recorded on or reproduced from two sorts of optical information recording mediums having different substrate thicknesses, different information pit hole depths, and different recording densities, wherein:

a thickness of said objective lens independently having aberration of the same conditions is different at a central portion and a peripheral portion thereof.

13. An optical head as claimed in claim 12 wherein in the case that the information recorded on a second optical information recording medium having a low information recording density is reproduced, a light amount of light entered into a peripheral portion of said objective lens is reduced or interrupted, whereas in the case that a first optical information recording medium having a high information recording density is reproduced, a reduction or an interruption of an incident light amount is not carried out.

14. An optical head as claimed in claim 12, wherein means for reducing the light amount of the light or interrupting the light entered into the peripheral portion of said objective lens is made with the objective lens in an integral form.

15. An optical head as claimed in claim 13, wherein in the case that the second optical information recording medium having a low information recording density is recorded or reproduced, in order to trace the collective spot onto the information recording pit array of the information recording film surface, means for reducing a light amount of light or interrupting the light entered into a peripheral portion of said objective lens is simultaneously moved in conjunction with movement of said objective lens.

16. An optical head as claimed in claim 10, wherein a substrate thickness of said first information recording medium having the high information recording density is 0.6 mm, and a substrate thickness of said second information recording medium is 1.2 mm.

17. An optical head as claimed in claim 12, wherein in the case that the information recorded on said second optical information recording medium having the low information density is reproduced by employing the objective lens recited in any of claim 2 to claim 9, a dimension of the photodetector and a dimension of the optical system are set in such a manner that the light entered into the peripheral portion of said objective lens is sufficiently reduced on the photodetector.

18. An optical head comprising: a light source; an objective lens for focusing light from said light source to an optical recording medium; a light branching element for branching reflection light reflected from the optical recording medium from a light path returned to the light source; a photodetector; and means for positioning a focused light spot onto an information pit array of the optical recording medium; wherein:

in order to optically record/reproduce information on/from the optical recording medium through a transparent parallel plate substrate, a paraxial focus of the objective lens for focusing laser light onto an information recording film surface on the side of the light source is separated from a surface of the objective lens on the side of the light source by greater than or equal to 2 mm; said optical head further comprising means for reducing a light amount of light or for interrupting the light entered into a peripheral portion of the objective lens; and a galvanometer mirror employed as an actuator for tracking the focused light spot to the information pit array on the optical recording medium; wherein a rotary shaft of the galvanometer mirror is arranged near the paraxial focus of said objective lens on the side of the laser light source.

19. An optical head comprising: a light source; an objective lens for focusing light from said light source to an optical recording medium as a reproducing spot thereon; a light branching element for branching reflection light reflected from the optical recording medium from a light path returned to the light source; a photodetector; and means for positioning a collective spot onto an information pit array of the optical recording medium; wherein signals are reproduceable from two sorts of optical information recording mediums having different substrate thicknesses, different information pit hole depths, and different recording densities without replacing the objective lens; and when a first optical information recording medium having a high information recording density is reproduced, a ratio of a total light amount of the reproducing spot on said first optical information recording medium to a total incident light amount of a lens portion is greater than or equal to 90%.

* * * * *